United States Patent
Sika

(10) Patent No.: US 11,245,520 B2
(45) Date of Patent: Feb. 8, 2022

(54) SYSTEMS AND METHODS FOR GENERATING IDENTIFYING INFORMATION BASED ON SEMICONDUCTOR MANUFACTURING PROCESS VARIATIONS

(71) Applicant: Lucid Circuit, Inc., Santa Monica, CA (US)

(72) Inventor: Michel D Sika, Santa Monica, CA (US)

(*) Notice: Subject to any disclaimer, the term of this patent is extended or adjusted under 35 U.S.C. 154(b) by 0 days.

(21) Appl. No.: 16/275,292

(22) Filed: Feb. 13, 2019

(65) Prior Publication Data

US 2019/0253247 A1    Aug. 15, 2019

Related U.S. Application Data

(60) Provisional application No. 62/630,797, filed on Feb. 14, 2018, provisional application No. 62/683,497, filed on Jun. 11, 2018.

(51) Int. Cl.
| | |
|---|---|
| *H04L 9/08* | (2006.01) |
| *H04L 9/32* | (2006.01) |
| *H04L 9/06* | (2006.01) |

(52) U.S. Cl.
CPC .......... *H04L 9/0866* (2013.01); *H04L 9/3239* (2013.01); *H04L 9/3247* (2013.01); *H04L 9/0643* (2013.01); *H04L 2209/38* (2013.01); *H04L 2209/88* (2013.01)

(58) Field of Classification Search
CPC ............................ H04L 9/0866; H04L 9/3247
USPC ....................................................... 713/189
See application file for complete search history.

(56) References Cited

U.S. PATENT DOCUMENTS

| | | | | |
|---|---|---|---|---|
| 6,161,213 | A * | 12/2000 | Lofstrom ............... | H04L 9/0866 324/750.15 |
| 6,871,284 | B2 * | 3/2005 | Cooper ............... | H04L 41/0681 713/187 |
| 2005/0151656 | A1 | 7/2005 | Yuen | |
| 2006/0155840 | A1 | 7/2006 | Giffin et al. | |
| 2007/0067136 | A1 | 3/2007 | Conroy et al. | |
| 2008/0005539 | A1 | 1/2008 | Velhal et al. | |
| 2009/0063122 | A1 * | 3/2009 | Nasle ................. | G05B 23/0235 703/18 |
| 2009/0157740 | A1 * | 6/2009 | Barley ............... | G06F 16/90339 |
| 2010/0050138 | A1 * | 2/2010 | Chidambarrao ...... | G06F 30/398 716/106 |
| 2011/0061947 | A1 * | 3/2011 | Krah ..................... | G06F 1/3262 178/18.01 |

(Continued)

OTHER PUBLICATIONS

Akgun et al., "Scalable Memory Fabric for Silicon Interposer-Based Multi-Core Systems", 2016 IEEE 34th International Conference on Computer Design (ICCD), pp. 33-40 (Year: 2016).

(Continued)

*Primary Examiner* — Dant B Shaifer Harriman
(74) *Attorney, Agent, or Firm* — Andy T. Pho; Shant Tchakerian

(57) ABSTRACT

A microelectronic device that includes a sensor die, compute fabric dies, and storage component dies. Each compute fabric die has processing circuit components and data storage circuit components. A circuit component is selected and identifying information is generated by changing biasing and control parameters of the selected circuit component.

20 Claims, 32 Drawing Sheets

(56) References Cited

U.S. PATENT DOCUMENTS

| | | | |
|---|---|---|---|
| 2011/0087887 A1 | 4/2011 | Luft et al. | |
| 2011/0185203 A1 | 7/2011 | Carlson et al. | |
| 2011/0208972 A1* | 8/2011 | Liu | H04L 9/3073 713/179 |
| 2013/0071085 A1* | 3/2013 | Ryman | H04N 5/783 386/230 |
| 2013/0332987 A1* | 12/2013 | Tenneti | H04L 63/10 726/1 |
| 2014/0173060 A1 | 6/2014 | Jubran et al. | |
| 2015/0026451 A1 | 1/2015 | Doerr et al. | |
| 2015/0058928 A1* | 2/2015 | Guo | H04L 63/0876 726/3 |
| 2015/0106640 A1 | 4/2015 | Brackman et al. | |
| 2016/0062421 A1 | 3/2016 | Sugawara et al. | |
| 2016/0179680 A1 | 6/2016 | Shows et al. | |
| 2016/0182045 A1* | 6/2016 | Mai | G09C 1/00 326/8 |
| 2017/0046664 A1* | 2/2017 | Haldenby | H04L 63/0876 |
| 2017/0206113 A1 | 7/2017 | Krig et al. | |
| 2017/0269652 A1 | 9/2017 | Lee et al. | |
| 2017/0351241 A1* | 12/2017 | Bowers | G05B 19/406 |
| 2017/0373859 A1* | 12/2017 | Shors | G09C 5/00 |
| 2018/0082007 A1* | 3/2018 | Mandal | G06F 30/392 |
| 2018/0103013 A1* | 4/2018 | Imai | H04L 63/06 |
| 2018/0176223 A1* | 6/2018 | Hutchinson | H04L 63/0853 |
| 2018/0284737 A1 | 10/2018 | Cella et al. | |
| 2018/0351753 A1* | 12/2018 | Gardner | G06F 21/72 |
| 2019/0044515 A1 | 2/2019 | Gutala et al. | |
| 2019/0188053 A1 | 6/2019 | Benke et al. | |
| 2019/0190725 A1* | 6/2019 | De | H04L 9/3278 |
| 2019/0305971 A1* | 10/2019 | Li | G11C 7/12 |

OTHER PUBLICATIONS

International Search Report and Written Opinion for PCT Application No. PCT/US2019/036190, dated Sep. 3, 2019.

Iturbe et al., "Towards a generic and adaptive System-on-Chip controller for space exploration instrumentation" In: 2015 NASA/ESA Conference on Adaptive Hardware and Systems (AHS). Jun. 18, 2015 Retrieved on Aug. 9, 2019 from trs.jpl.nasa.gov/bitstream/handle/2014/45731/15_2124_A1b.pdf.

* cited by examiner

500 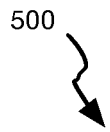

Use the identifying information to generate a secret cryptographic key, collect a first sample of sensor data from the first sensor, generate a first data structure that includes the first sample of sensor data, generate a digital signature by signing the first data structure by using the secret cryptographic key, and provide the signature and the first data structure to a blockchain system — S513

FIGURE 5J

Microelectronic device 1200

SYSTEMS AND METHODS FOR GENERATING IDENTIFYING INFORMATION BASED ON SEMICONDUCTOR MANUFACTURING PROCESS VARIATIONS

CROSS-REFERENCE TO RELATED APPLICATIONS

This application claims the benefit of U.S. Provisional Application Ser. No. 62/630,797, filed on 14 Feb. 2018, and U.S. Provisional Application Ser. No. 62/683,497, filed on 11 Jun. 2018, which are incorporated in their entirety by this reference.

TECHNICAL FIELD

This disclosure relates generally to data collection at edge devices, and more specifically to new and useful systems and methods for generating identity attestations attributable to internally generated data collected at an edge device.

BACKGROUND

Ensuring the safety, accuracy, reliability and traceability and usability of data is a challenge. Typical data collection systems, however, do not ordinarily provide control or verification mechanisms for ensuring the safety, accuracy, reliability and traceability and usability of data between the information source (sometimes referred to as the "edge") where data is collected and the point where this data is entered into a data processing system or registry.

BRIEF DESCRIPTION OF THE FIGURES

FIGS. 5A-J are representations of methods, according to embodiments;

DESCRIPTION OF EMBODIMENTS

Figure 1:
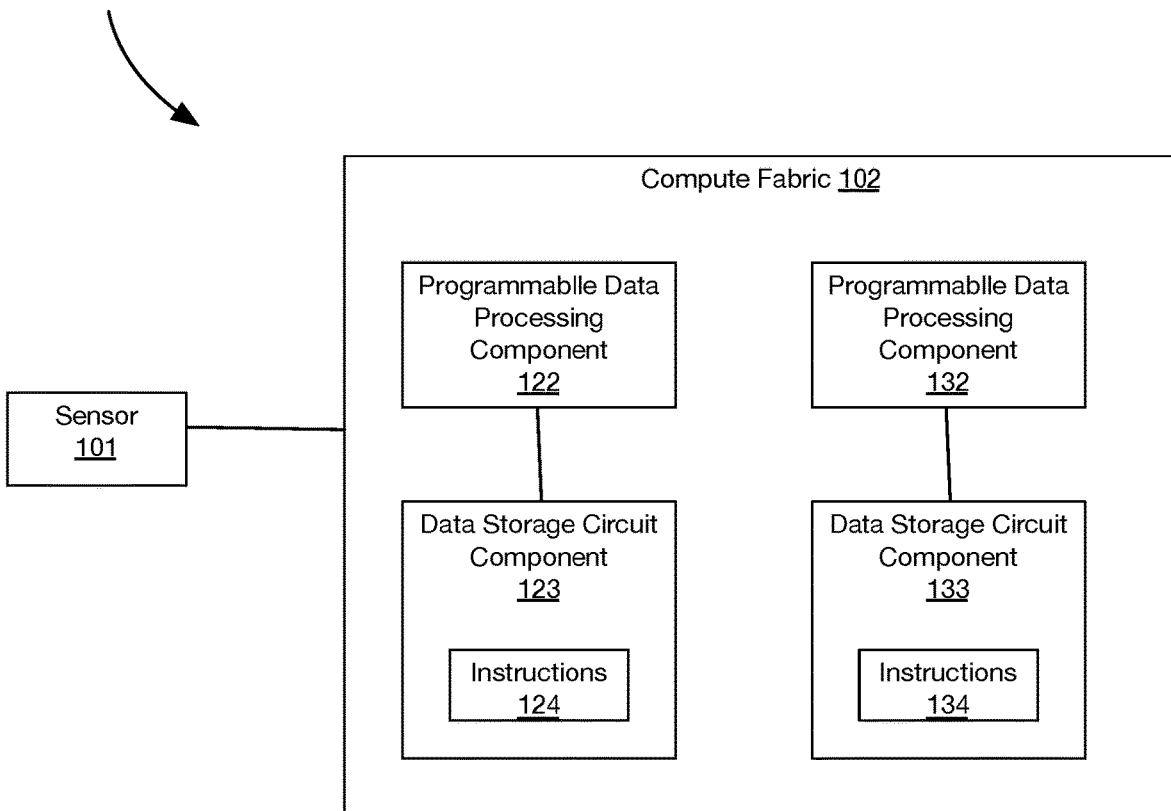
FIG. 1 is a schematic representation of a system, according to embodiments.

The following description of embodiments is not intended to limit the disclosure to these embodiments, but rather to enable any person skilled in the art to make and use the embodiments disclosed herein.

1. OVERVIEW

Embodiments described herein provide systems and methods for collection and processing of data at an edge via a microelectronic device that includes a sensor and a compute fabric. In some embodiments, data is collected and processed by using a microelectronics device that includes one or more sensors and one or more compute fabric components (e.g., data processing components, data storage components), wherein the sensors are electrically or communicatively coupled to the compute fabric components. In some embodiments, the microelectronic device generates identifying information.

In some embodiments, the microelectronic device tags data provided by the sensor with tagging information generated from the identifying information.

In some embodiments, the microelectronic device uses the identifying information to generate a secret cryptographic key, collects a first sample of sensor data from the sensor, and generates a digital signature by signing the first sample of sensor data by using the secret cryptographic key. In some embodiments, the microelectronic device provides the signature and the first sample of the sensor data to a blockchain system.

In some embodiments, the microelectronic device collects a first sample of sensor data from the sensor, generates a hash of the first sample of sensor data, and provides the hash and the first sample of the sensor data to an external blockchain system.

In some embodiments, the microelectronic device uses the identifying information to generate a secret cryptographic key, collects a first sample of sensor data from the first sensor, generates a first data structure that includes the first sample of sensor data, generates a digital signature by signing the first data structure by using the secret cryptographic key, and provides the signature and the first data structure to a blockchain system.

In some embodiments, the microelectronic device collects a first sample of sensor data from the sensor, generates a first data structure that includes the first sample of sensor data and the identifying information, generates a hash of the first data structure, and provides the hash and the first data structure to an external blockchain system.

In some embodiments, the microelectronic device uses the identifying information to generate a secret cryptographic key, collects a first sample of sensor data from the sensor, generates a first data structure that includes the first sample of sensor data and the identifying information, generates a hash of the first data structure, generates a digital signature by signing the hash by using the secret cryptographic key, and provides the hash, the signature, and the first data structure to an external blockchain system. In some embodiments, the microelectronic device uses the identifying information to generate a secret cryptographic key, collects a first sample of sensor data from the sensor, generates a first data structure that includes the first sample of sensor data and the identifying information, generates a hash of the first data structure, generates a digital signature by signing the first data structure by using the secret cryptographic key, and provides the hash, the signature, and the first data structure to an external blockchain system.

In some embodiments, the microelectronic device generates an identity attestation from the identifying information, collects a first sample of sensor data from the sensor, generates a first data structure that includes the first sample of sensor data and the identity attestation, generates a hash of the first data structure, and provides the hash and the first data structure to an external blockchain system.

Some embodiments include a self contained microelectronics device fabricated in a modern semiconductor process, that is capable of directly collecting data from information at the edge and can apply hardware-based blockchain related computations.

In some embodiments, the microelectronics device includes a data storage circuit component that includes processing circuit instructions for generating at least one identity attestation that can be used to anchor data blocks or records to a blockchain.

Embodiments disclosed herein provide semiconductor-hardware-based security features to improve the safety of data and records.

In some embodiments, the microelectronics device includes a data storage circuit component that includes processing circuit instructions for validating identity attestations as necessary to securely communicate with healthcare registry systems.

Embodiments disclosed herein provide mechanisms for patient data traceability between the collection edge and the user of a healthcare registry.

In some embodiments, the microelectronics device includes a data storage circuit component that includes processing circuit instructions for dynamically creating a new blockchain transaction for a patient.

In some embodiments, the microelectronics device includes a data storage circuit component that includes processing circuit instructions for dynamically creating a new blockchain transaction pertinent to one or more patient specific record subsets.

In some embodiments, the microelectronics device includes a data storage circuit component that includes processing circuit instructions for dynamically creating a new blockchain transaction for record or data types.

In some embodiments, the microelectronics device includes a data storage circuit component that includes processing circuit instructions for dynamically creating a new blockchain transaction for one or more collections of a unique patient specific record or data types.

In some embodiments, the microelectronics device includes a data storage circuit component that includes processing circuit instructions for dynamically creating a new blockchain transaction for one or more collections of one or more patient specific record or data type subsets.

In some embodiments, the microelectronics device includes a data storage circuit component that includes processing circuit instructions for dynamically creating a new chain in an existing blockchain specific to one or more collections record or data types.

In some embodiments, the microelectronics device includes a data storage circuit component that includes processing circuit instructions for dynamically creating a new chain in an existing blockchain for a patient.

In some embodiments, the microelectronics device includes a data storage circuit component that includes processing circuit instructions for dynamically creating a new chain in an existing blockchain pertinent to one or more patient specific record or data type subsets.

In some embodiments, the microelectronics device includes a data storage circuit component that includes processing circuit instructions for dynamically creating a new chain in an existing blockchain for record or data types.

In some embodiments, the microelectronics device includes a data storage circuit component that includes processing circuit instructions for dynamically creating a new chain in an existing blockchain for one or more collections of a unique patient specific record or data types.

In some embodiments, the microelectronics device includes a data storage circuit component that includes processing circuit instructions for dynamically creating a new chain in an existing blockchain for one or more collections of one or more patient specific record or data type subsets.

In some embodiments, the microelectronics device includes a data storage circuit component that includes processing circuit instructions for dynamically creating a new chain in an existing blockchain specific to one or more collections record or data types.

In some embodiments, the microelectronics device includes a data storage circuit component that includes processing circuit instructions for generating at least one identity attestation that can be used in non-blockchain authentication or authorization based communication.

In some embodiments, the microelectronics device includes a data storage circuit component that includes processing circuit instructions for deterministically recording the information source to which it can attribute a unique identifier.

In some embodiments, the microelectronics device includes a data storage circuit component that includes processing circuit instructions for deterministically validating an information source that provides a unique identifier.

In some embodiments, the microelectronics device includes a data storage circuit component that includes processing circuit instructions for deterministically controlling the influx of data from an information source and can thus determine where data is collected from.

In some embodiments, the microelectronics device includes a data storage circuit component that includes processing circuit instructions for directly controlling what data is collected.

In some embodiments, the microelectronics device includes a data storage circuit component that includes processing circuit instructions for, for a given information source or set of information sources, assessing the collected data coverage, distribution or density relative to an application information space.

In some embodiments, the microelectronics device includes a data storage circuit component that includes processing circuit instructions for determining and controlling the methods with which data is collected. This makes it possible for the embodiments to reliably and equitably control the quality and quantity of data being collected as well as the ability to correlate different data from different information sources.

In some embodiments, the microelectronics device includes a data storage circuit component that includes processing circuit instructions for performing error correction processing for data collected in real-time.

2. SYSTEMS

FIG. 1

FIG. 1 is a schematic representation of a system 100, according to some embodiments. In some embodiments, the system 100 includes at least one sensor 101 and a runtime-adaptable compute fabric 102. In some embodiments, the system 100 includes a runtime-adaptable compute fabric 102 that includes at least one sensor (e.g., a sensor similar to sensor 101). In some embodiments, the runtime-adaptable compute fabric 102 is included in a microelectronic device. In some embodiments, the sensor 101 is included in a microelectronic device. In some embodiments, the runtime-adaptable compute fabric 102 and the sensor 101 are included in different microelectronic devices. In some embodiments, the runtime-adaptable compute fabric 102 and the sensor 101 are included a same microelectronic device.

In some embodiments, the runtime-adaptable compute fabric 102 includes a plurality of compute fabric components, including at least one programmable data processing circuit component (e.g., 122) and at least one data storage circuit component (e.g., 123). In some embodiments, the runtime-adaptable compute fabric 102 includes a plurality of compute fabric components, including at least one programmable data processing circuit component (e.g., 122), at least one data storage circuit component (e.g., 123) and at least one sensor.

In some embodiments, the compute fabric components of 102 are arranged on a single compute fabric die. In some embodiments, the compute fabric components of 102 are arranged on a plurality of compute fabric dies. In some embodiments, a programmable data processing circuit component 122 is coupled to a data storage circuit component 123, and the data storage circuit component includes instructions 124 that are executed by the data processing circuit component 122. In some embodiments, the programmable data processing circuit component 122 is re-programmed by updating the instructions 124. In some embodiments, a programmable data processing circuit component 132 is coupled to a data storage circuit component 133, and the data storage circuit component includes instructions 134 that are executed by the data processing circuit component 132. In some embodiments, the programmable data processing circuit component 132 is re-programmed by updating the instructions 134.

In some embodiments, system 100 includes a plurality of sensors. In some embodiments, the plurality of sensors and one or more compute fabric components of the runtime-adaptable compute fabric 102 are included in a same microelectronic device package.

In some embodiments, at least one sensor is integrated into the runtime-adaptable compute fabric 102, wherein the compute fabric includes the one or more compute fabric components.

In some embodiments, a programmable data processing circuit component 122 is coupled to a sensor included in the compute fabric 102. In some embodiments, a data storage circuit component 123 is coupled to a sensor included in the compute fabric 102.

In some embodiments, at least one sensor is fabricated in a first semiconductor integrated circuit die, the one or more compute fabric components are fabricated in a second semiconductor integrated circuit die, and at least one sensor of the first integrated circuit die is directly coupled to at least one compute fabric component of the second semiconductor integrated circuit die via an interface medium.

In some embodiments, at least one sensor is fabricated in a first semiconductor integrated circuit die, the one or more compute fabric components are fabricated in a second semiconductor integrated circuit die, at least one sensor of the first integrated circuit die is directly coupled to at least one compute fabric component of the second semiconductor integrated circuit die via an interface medium, and a sensor external to the microelectronic device is communicatively coupled (or electrically coupled) to a sensor of the first semiconductor integrated circuit die.

In some embodiments, a sensor is communicatively coupled (or electrically coupled) to at least one compute fabric component via a bridge interface medium that is external to the one or more compute fabric component, and the bridge medium is communicatively (or electrically) coupled to the one or more compute fabric component.

In some embodiments, a sensor is electrically coupled to the compute fabric via an electric interconnect.

In some embodiments, a sensor is electrically coupled to the compute fabric via another sensor that is coupled to the compute fabric.

In some embodiments, the compute fabric receives sensor data from a device that is external to the compute fabric and that is electrically coupled to the compute fabric via an electric interconnect.

In some embodiments, the compute fabric receives sensor data from a device that is external to the compute fabric and that is electrically coupled to the compute fabric via another sensor that is coupled to the compute fabric.

In some embodiments, the compute fabric is coupled to a first sensor that is constructed to receive sensor data transmitted by an external transmitter that is communicatively coupled to a second sensor that is external to the compute fabric, wherein the second sensor that is external to the compute fabric generates the sensor data transmitted by the external transmitter.

In some embodiments, a first programmable data processing circuit component (e.g., 122) is coupled to a first data storage circuit component (e.g., 123) and at least a second data storage circuit component (e.g., 133).

In some embodiments, a first programmable data processing circuit component (e.g., 122) is coupled to a first data storage circuit component (e.g., 123) and at least a second programmable data processing circuit component (e.g., 132).

In some embodiments, a first programmable data processing circuit component (e.g., 122) is coupled to at least a second programmable data processing circuit component (e.g., 132).

In some embodiments, a first programmable data processing circuit component (e.g., 122) is coupled to a first data storage circuit component (e.g., 123), and at least a second programmable data processing circuit component (e.g., 132) is also coupled to the first data storage circuit component (e.g., 123).

In some embodiments, the system 100 includes a sensor constructed to measure voltage and a circuit constructed to measure current.

In some embodiments, the system 100 includes a sensor constructed to measure electromagnetic waves.

In some embodiments, the system 100 includes a sensor constructed to measure magnetic waves.

In some embodiments, the system 100 includes a sensor constructed to measure temperature.

FIG. 2

Figure 2:
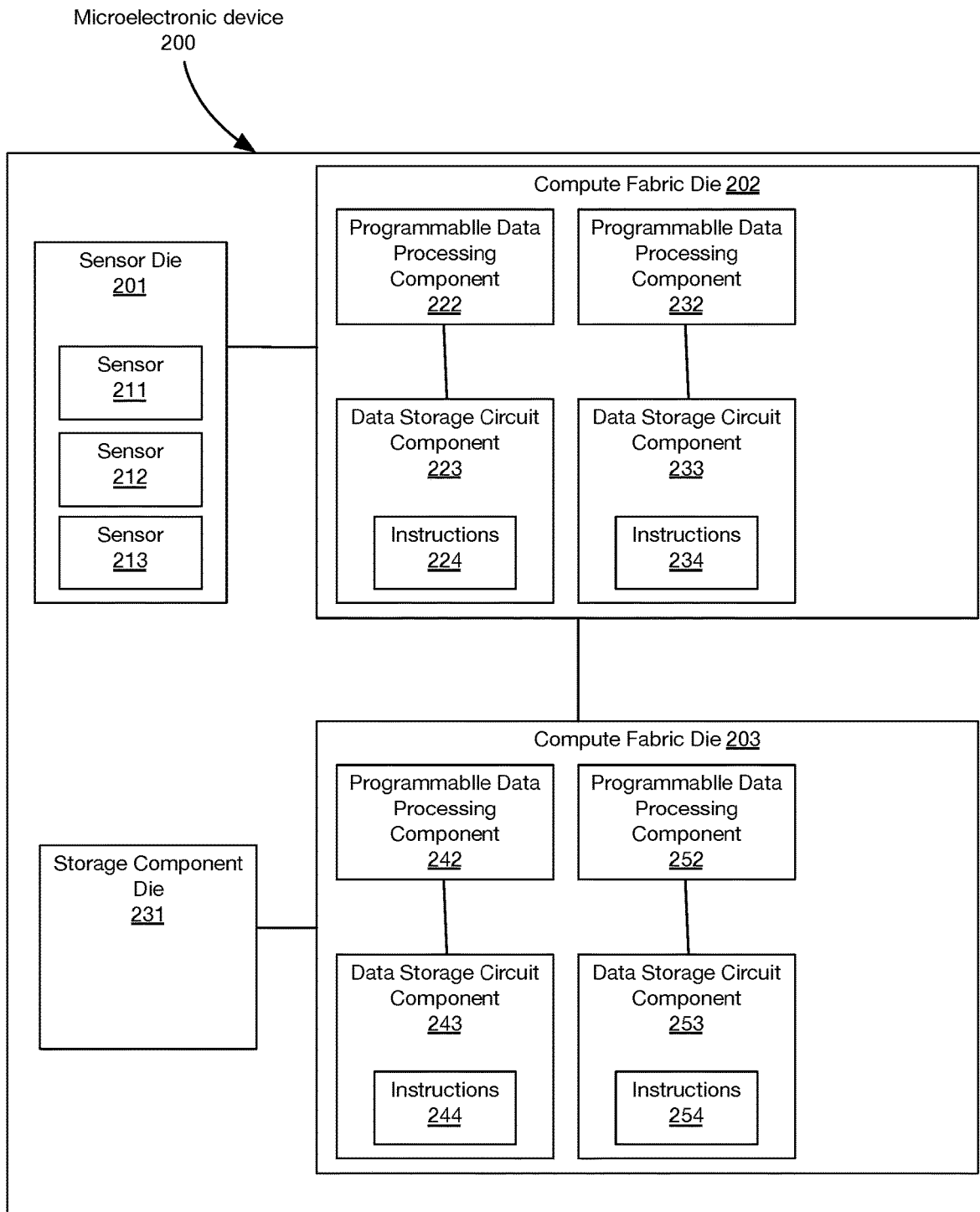
FIG. 2 is a schematic representation of a system, according to embodiments.

FIG. 2 is a schematic representation of a system 200 that is implemented as a microelectronic device that includes at least a first sensor die 201 and a first runtime-adaptable compute fabric die 202. In some embodiments, the first sensor die 201 and the compute fabric die 202 are integrated circuit semiconductor dies.

In some embodiments, the sensor die 201 includes a plurality of sensors (e.g., 211, 212, 213) including a first sensor 211. In some embodiments, the microelectronic device includes a plurality of sensor dies, each sensor die including at least one sensor.

In some embodiments, the first runtime-adaptable compute fabric die 202 includes a first programmable data processing circuit component 222 and a first data storage circuit component 223, wherein the first programmable data processing circuit component is electrically coupled to the first data storage circuit component.

In some embodiments, the first runtime-adaptable compute fabric die 202 includes a plurality of programmable data processing circuit components (e.g., 222, 232) and data storage circuit components (e.g., 223, 233), wherein within the first compute fabric die 202 at least one of the programmable data processing circuit components (e.g., 222) is electrically coupled to at least one of the plurality of data storage circuit components (e.g., 223).

In some embodiments, the microelectronic device includes a plurality of runtime-adaptable compute fabric dies including the first runtime-adaptable compute fabric die 202 and a second runtime-adaptable compute fabric die 203. In some embodiments, each compute fabric die includes a first programmable data processing circuit component (e.g., 222, 242) and a first data storage circuit component (e.g., 223, 243), wherein the first programmable data processing circuit component is electrically coupled to the first data storage circuit component. In some embodiments, each compute fabric die (e.g., 202) includes a plurality of programmable data processing circuit components (e.g., 222, 232, 242, 252) and data storage circuit components (e.g., 223, 233, 243, 253), wherein within each compute fabric die (e.g., 202, 203) at least one of the programmable data processing circuit components is electrically coupled to at least one of the plurality of data storage circuit components. In some embodiments, each data storage component includes instructions (e.g., 224, 234, 244, 254) that are executed by a data processing circuit component coupled to the data storage component.

In some embodiments, the microelectronic device includes at least one storage component die 231, wherein each storage component die is electrically coupled to at least one of the plurality of compute fabric dies (e.g., 202, 203). In some embodiments, the microelectronic device includes at least one storage component die 231, wherein each storage component die is electrically coupled to at least one of the plurality of compute fabric dies (e.g., 202, 203) via one of an integrated interface medium (as described herein), a bridge device (as described herein), an electrical interconnect, and a transmitter (as described herein).

In some embodiments, each sensor die (e.g., 201), compute fabric die (e.g., 202, 203), and storage component die (e.g., 231) is an integrated circuit semiconductor die.

In some embodiments, the microelectronic device includes at least a first compute fabric die (e.g., 202) and a second compute fabric die (e.g., 203) electrically coupled to the first compute fabric die (e.g., 202) via one of an integrated interface medium (as described herein), a bridge device (as described herein), an electrical interconnect, and a transmitter (as described herein).

In some embodiments, a data processing component of the microelectronic device is electrically coupled to the first sensor 211. In some embodiments, a storage component of the microelectronic device is electrically coupled to the first sensor 211.

In some embodiments, each compute fabric die has a same system architecture. In some embodiments, each processing circuit component has a same instruction set.

In some embodiments, at least one data processing circuit component (e.g., 222) is coupled to a data storage circuit component (e.g., 223) that includes processing circuit instructions (e.g., 224) for selecting at least one of a sensor (e.g., 211), a data storage circuit component (e.g., 222), and a data processing circuit component (e.g., 223) as an intrinsic properties component, and at least one data processing circuit component is coupled to a data storage circuit component that includes processing circuit instructions (e.g., 234) for generating identifying information by changing biasing and control parameters of the selected intrinsic properties component, and generating the identifying information based on the results of the changing of the biasing and control parameters.

In some embodiments at least one storage component die includes a high bandwidth memory (HBM).

In some embodiments, at least one programmable data processing component is constructed to perform linear algebra computation.

In some embodiments, at least one programmable data processing component is constructed to perform arithmetic.

In some embodiments, at least a first compute fabric die is electrically coupled to a second compute fabric die in a die stacking arrangement.

In some embodiments, at least a first compute fabric die is electrically interconnected to a second compute fabric die via at least one TSV, and an interposer die is stacked atop the first compute fabric die and the second compute fabric die.

In some embodiments, at least a first compute fabric die is electrically coupled to a second compute fabric die via an interface medium. In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die.

In some embodiments, at a first compute fabric dies is electrically coupled to a first storage component die in a die stacking arrangement.

In some embodiments, at least a first compute fabric die is electrically interconnected to a first storage component die via at least one TSV, and an interposer die is stacked atop the first compute fabric die and the first storage component die.

In some embodiments, at least a first compute fabric die is electrically interconnected to a first storage component die via an interface medium. In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die.

In some embodiments, at least a first storage component die is electrically coupled to a second storage component die in a die stacking arrangement.

In some embodiments, at least a first storage component die is electrically interconnected to a second storage component die via at least one TSV, and an interposer die is stacked atop the first storage component die and the second storage component die.

In some embodiments, at least a first storage component die is electrically interconnected to a second storage component die via an interface medium. In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die.

In some embodiments, each programmable data processing circuit component is electrically coupled to at least one data storage circuit component that includes machine-executable program instructions that are executable by the programmable data processing circuit component, and wherein each programmable data processing circuit component is programmed by storing program instructions at the storage circuit component electrically coupled to the data processing circuit component.

In some embodiments, the plurality of sensors are included in a first sensor die, the first sensor die is an integrated circuit semiconductor die, and the first sensor die is electrically coupled to at least one of a data processing component and a storage component of the microelectronic device via one of an integrated interface medium and a die stacking arrangement.

In some embodiments, the integrated interface medium includes through-silicon via (TSV) vertical electrical connections.

In some embodiments, the first sensor die (e.g., 201) includes at least one of a circuit constructed to measure voltage and a circuit constructed to measure current.

In some embodiments, the first sensor die (e.g., 201) includes at least one of a circuit constructed to measure electromagnetic waves.

In some embodiments, the first sensor die (e.g., 201) includes at least one of a circuit constructed to measure magnetic waves.

In some embodiments, the first sensor die (e.g., 201) includes at least one of a circuit constructed to measure temperature.

In some embodiments, the microelectronic device includes at least a second sensor that is different from the first sensor.

In some embodiments, each programmable data processing circuit component has a same system architecture.

In some embodiments, a first programmable data processing circuit component (e.g., 222) is coupled to a first data storage circuit component (e.g., 223) and at least a second data storage circuit component (e.g., 233, 243, 253).

In some embodiments, a first programmable data processing circuit component (e.g., 222) is coupled to a first data storage circuit component (e.g., 223) and at least a second programmable data processing circuit component (e.g., 232, 242, 252).

In some embodiments, a first programmable data processing circuit component (e.g., 222) is coupled to at least a second programmable data processing circuit component (e.g., 232, 242, 252).

In some embodiments, a first programmable data processing circuit component (e.g., 222) is coupled to a first data storage circuit component (e.g., 223), and at least a second programmable data processing circuit component (e.g., 232, 242, 252) is also coupled to the first data storage circuit component (e.g., 223).

FIGS. 8-14

Figure 8:
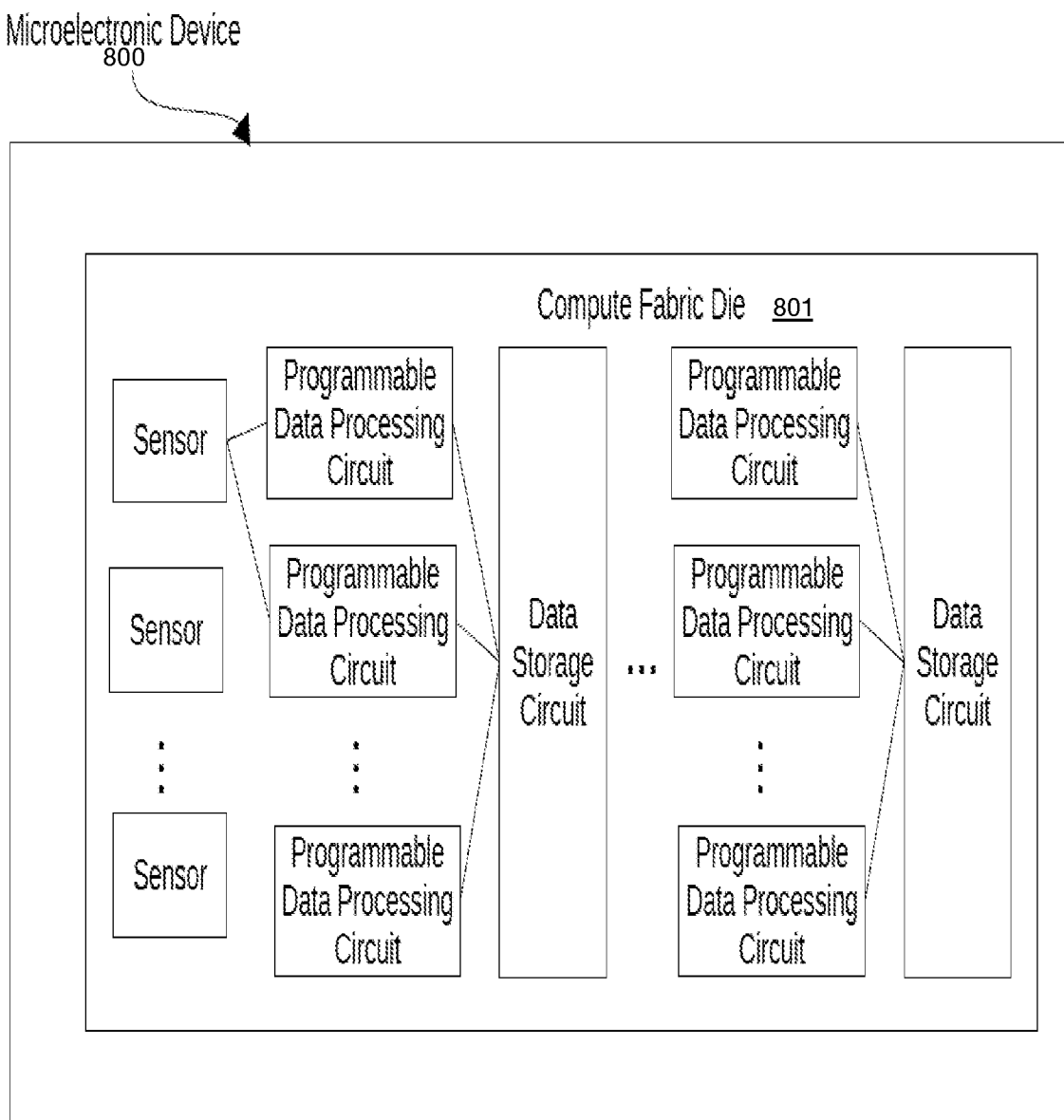

FIG. 8 is a schematic representation of a system 800 that includes a compute fabric die 801 that includes at least one sensor.

Figure 9:
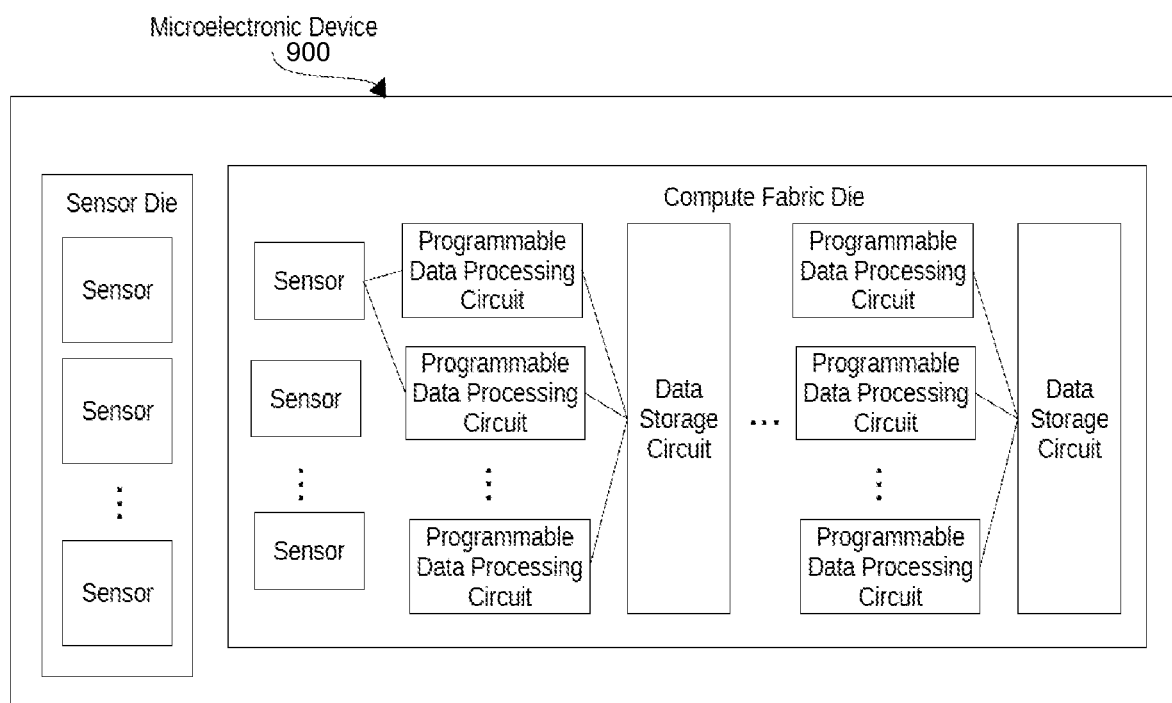

FIG. 9 is a schematic representation of a system 900 that includes a compute fabric die that includes at least one sensor, and a sensor die that includes a plurality of sensors.

Figure 10:
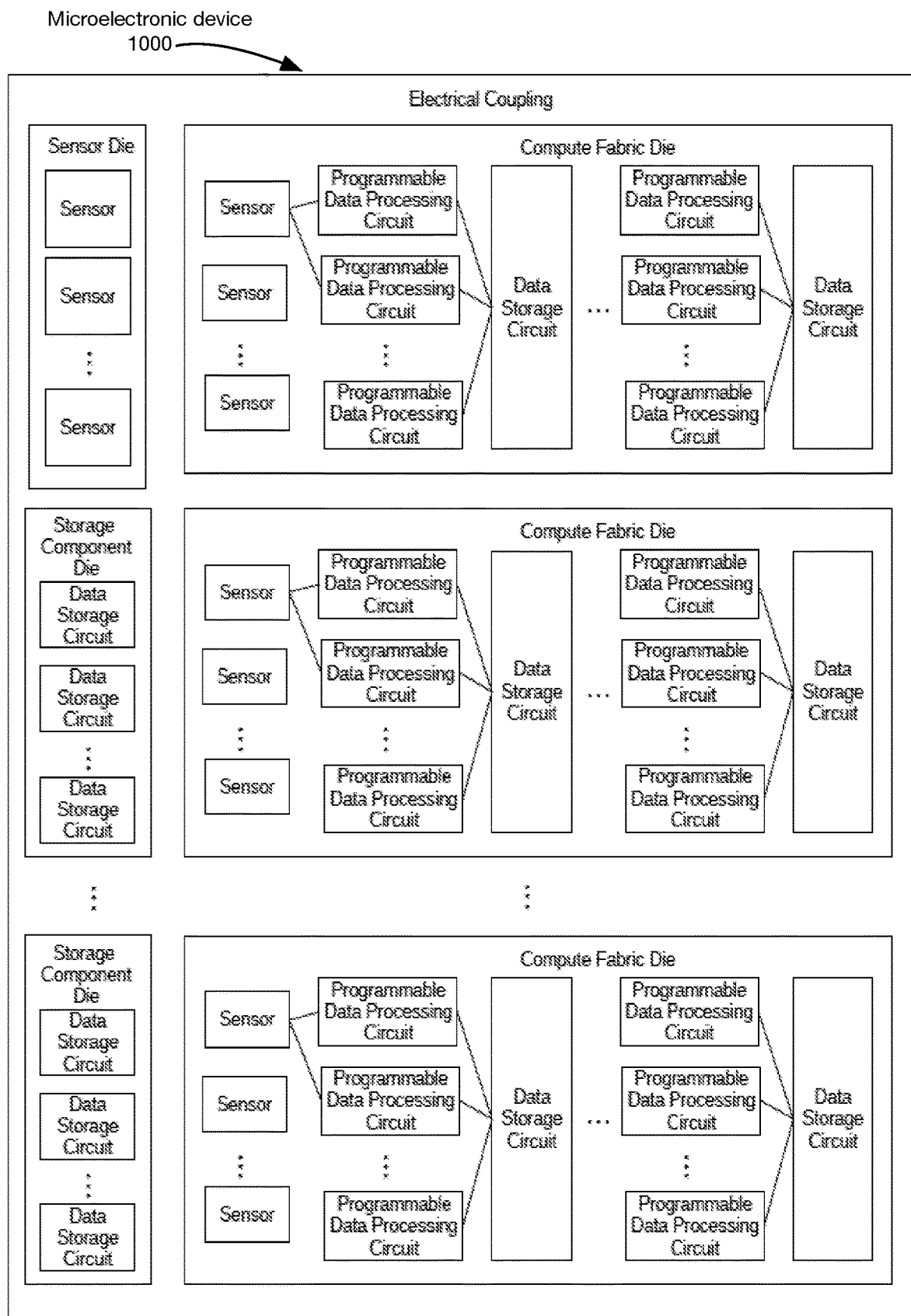

FIG. 10 is a schematic representation of a system 1000 that includes plural compute fabric dies that each include at least one sensor, a sensor die that includes a plurality of sensors, and plural storage component dies that each include a plurality of data storage circuits, coupled together via an electrical coupling.

Figure 11:
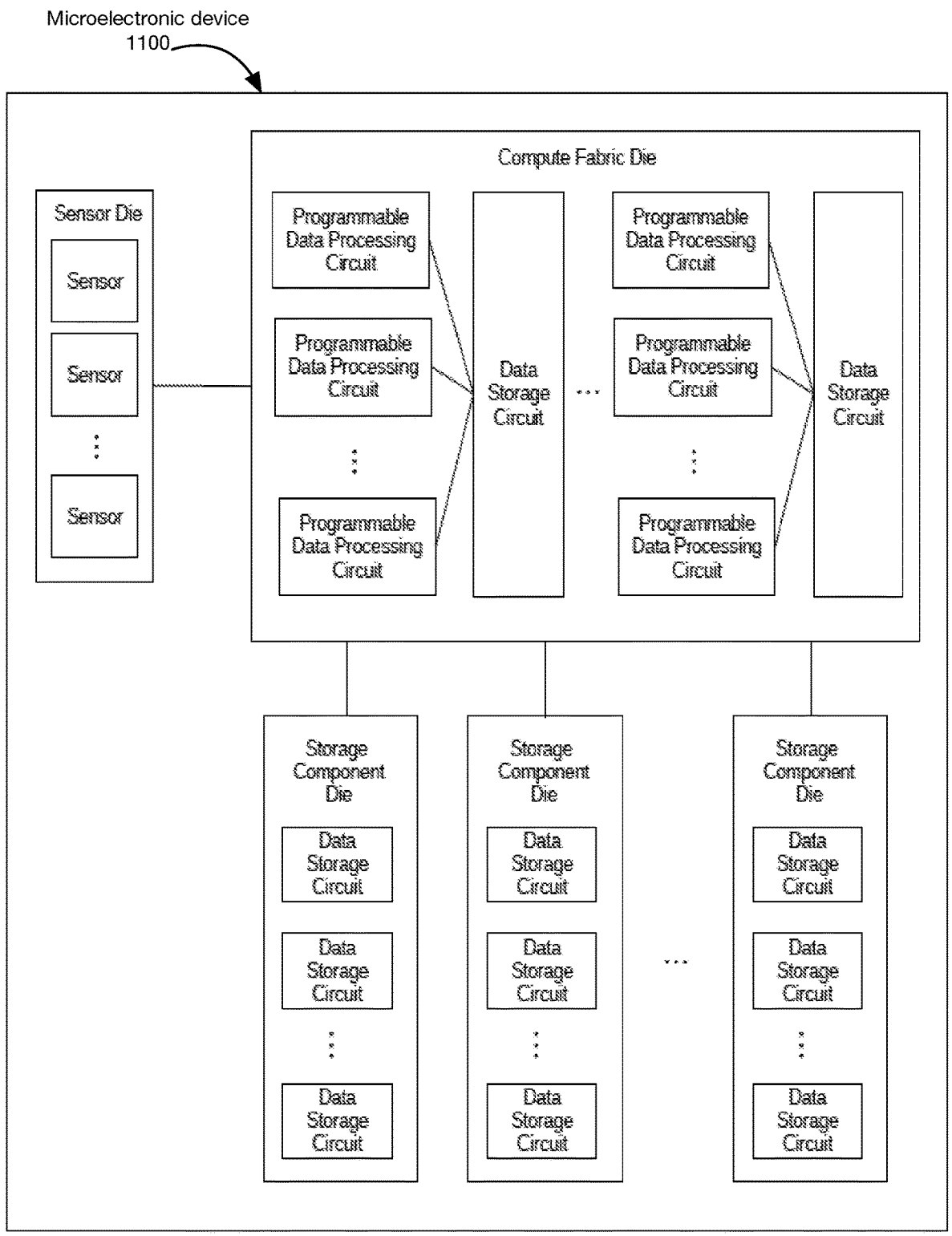

FIG. 11 is a schematic representation of a system 1100 that includes a compute fabric die coupled to a sensor die that includes a plurality of sensors, and coupled to plural storage component dies that each include a plurality of data storage circuits.

Figure 12:
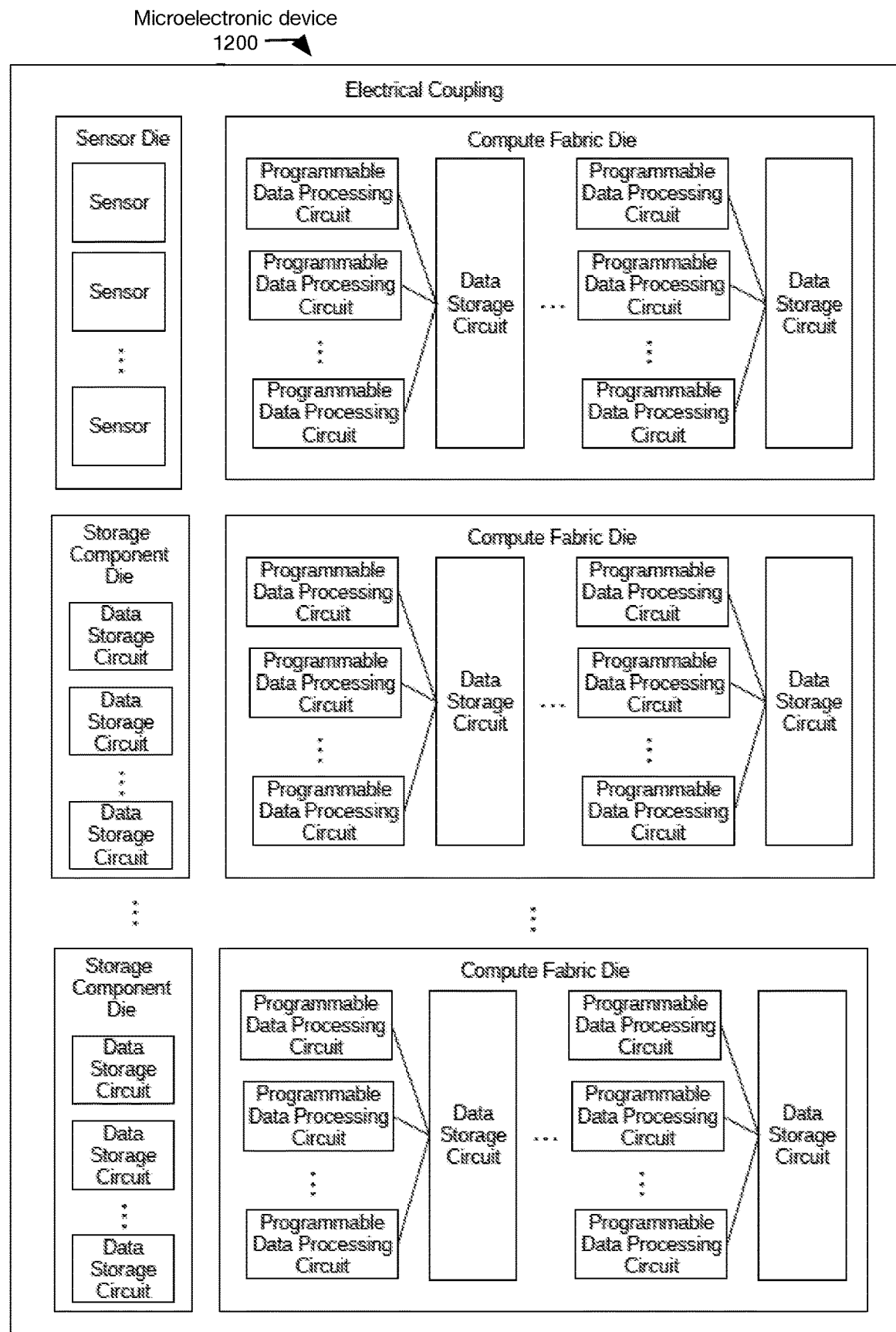

FIG. 12 is a schematic representation of a system 1200 that includes plural compute fabric dies, a sensor die that includes a plurality of sensors, and plural storage component dies that each include a plurality of data storage circuits, coupled together via an electrical coupling.

Figure 13:
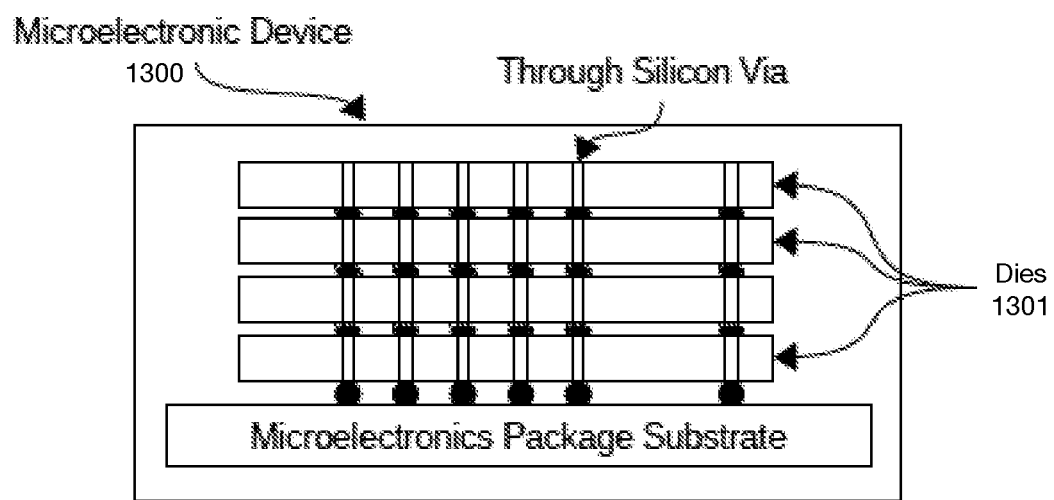

FIG. 13 is a schematic representation of a system 1300 in which dies 1301 are directly coupled via a through-silicon via (TSV) vertical electrical connection. In some embodiments, dies 1401 includes at least one of a compute fabric die, a storage die and a sensor die.

Figure 14:
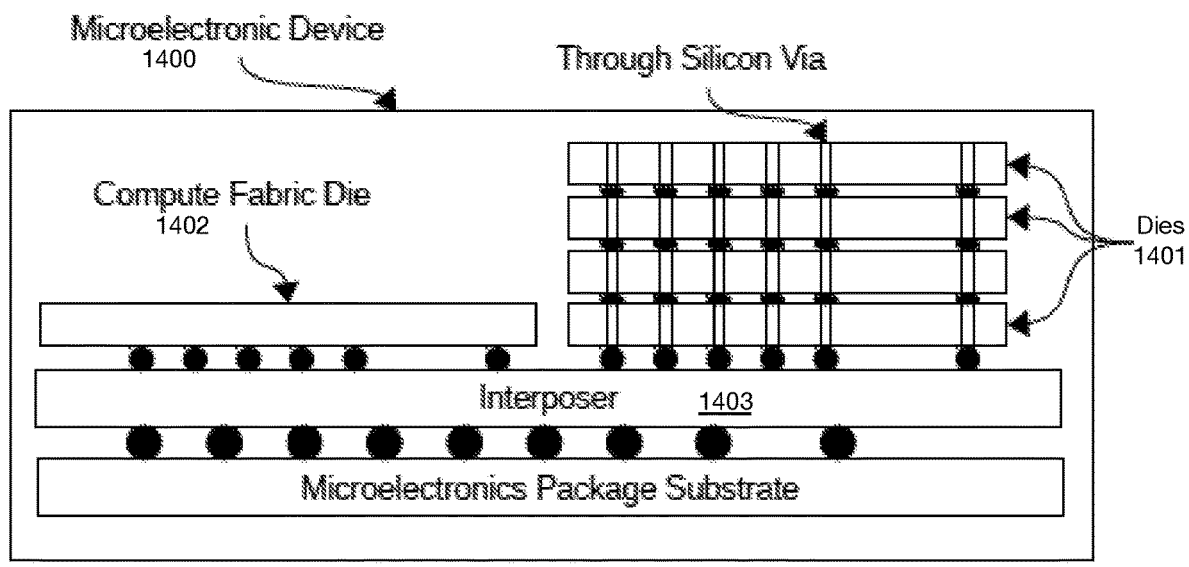

FIG. 14 is a schematic representation of a system 1400 having a stacked 2.5D configuration in which dies 1401 are directly coupled via a through-silicon via (TSV) vertical electrical connection and the dies 1401 are coupled to a compute fabric die 1402 via an interposer die 1403 that is stacked atop the adjacent die dies 1401 and 1402. In some embodiments, dies 1401 includes at least one of a storage die and a sensor die.

an interface medium involves a stacked 2.5D configuration were adjacent die are interconnected using TSVs and an interposer die is stacked atop the adjacent die.

Roles

In some embodiments, individual data processing components (programmable data processing circuit component) and data storage components are directly and individually programmed for different functions depending on the roles attributed to the component during program instruction execution. In some embodiments, each programmable data processing circuit component is electrically coupled to at least one data storage circuit component that includes machine-executable program instructions that are executable by the programmable data processing circuit component, and wherein each programmable data processing circuit component is programmed by storing program instructions at the storage circuit component electrically coupled to the data processing circuit component.

Typical roles may include but are not exclusively restricted to "data collection", "data integration", "analysis", "security", "intrinsic properties", "profiling", "monitoring", "data fusion", and "data attestation".

In a data collecting role, functions include commands for enabling and disabling the collection of data from sensor components. Data collecting role functions include commands for configuring sensor component operating properties such as sensor sensitivity, dynamic operating range, biasing conditions.

In a data integration role, functions include algorithm specific calculations, data retrieval and data storage commands aimed at combining data captured from sensor components by processing and storage components in data collecting roles. Functions in the data collection role also include commands to configure the functionality of components in the data collection role.

In an analysis role, processing and storage elements perform signal processing or error correction specific calculations along with associated data retrieval and data storage commands for preprocessing data in preparation of applying machine learning techniques. Examples of analysis include data sampling, time or spectral based filtering, recovery of corrupted sensor data. Functions in the analysis role also include commands to configure the functionality of components in the data integration role.

In the "intrinsic properties" role, processing components execute commands designed to place discrete processing, storage and sensor components in a maintenance mode and where certain biasing and control parameters of the components in the maintenance mode are continuously changed in order to heuristically collect information pertinent to the unique intrinsic physical specificities of each discrete component being exercised. These specificities are related to semiconductor process variations that occur naturally during manufacturing.

The intrinsic physical specificities of discrete sensor components can be used to calibrate individual sensor components.

Individual intrinsic physical specificities can be combined to calibrate groups of sensor components.

The intrinsic physical specificities of components can be applied to security and cryptography applications. Specifically, these features represent the effects of the semiconductor process variations that occur in individually fabricated parts can be used in key generation, authentication, authorization and data tagging.

Processing and storage components in the security role are configured to implement user selected security algorithms such as hashing computation, identity attestation creation, identity attestation validation. Functions include commands for interfacing with components in the analysis role in order to retrieve data from said components. Functions include commands to configure the functionality of components in the analysis role. Functions include calculation, data retrieval and data storage commands necessary for the implementation of well known security algorithms.

In a profiling role, functions include at least one of capturing and aggregation of statistical heuristic information pertinent to data in order to generate analytics (characteristic information summaries) for the purpose of characterizing data quality, detecting and learning data characteristic outliers/aberrations, classification of risk modalities, predicting failure probabilities, predicting failure modalities, and learning/identifying new modalities pertinent to data.

In a monitoring role, functions include comparing data characteristics against expected behavior profiles under defined operating/environmental paradigms.

In a data fusion role, functions include combining data from heterogeneous sources/sensors in order to create multimodal information by using application/data dependent statistical learning processes. Such information is produced by leveraging machine learning techniques to extract characteristic information from data/sensor sources that renders information properties of interest salient for the purpose of profiling, analysis, analytics extraction, attestation, and the like.

In a data attestation role, functions include at least one of tagging data and verifying existing embedded data tags in order to verify at least one of: authenticity (not tampered with), completeness (is any data missing), traceability (verifiable ledger of hops and/or path has data taken before getting here), authentication (source/transmitter validation and/or recipient validation), authorization (sender/recipient permission/credentials verification for data transfer), and accountability (deterministic traceability—is the—is traceability ledger correct/acceptable/match the expected path?).

Data Storage Circuit Components

In some embodiments, at least one data processing circuit component is coupled to a data storage circuit component that includes processing circuit instructions for tagging data provided by the first sensor with tagging information generated from the identifying information.

In some embodiments, at least one data processing circuit component is coupled to a data storage circuit component that includes processing circuit instructions for tagging analysis results generated for data provided by the first sensor with tagging information generated from the identifying information.

In some embodiments, at least one data processing circuit component is coupled to a data storage circuit component that includes processing circuit instructions for calibrating at least one of the plurality of sensors by using the identifying information.

In some embodiments, at least one data processing circuit component is coupled to a data storage circuit component that includes processing circuit instructions for generating a secret cryptographic key by using the identifying information.

In some embodiments, at least one data processing circuit component is coupled to a data storage circuit component that includes processing circuit instructions for generating a cryptographic private/public key pair by using the identifying information.

In some embodiments, at least one data processing circuit component is coupled to a data storage circuit component that includes processing circuit instructions for using the identifying information to generate a secret cryptographic key, collecting a first sample of sensor data from a sensor of the microelectronic device, and generating a digital signature by signing the first sample of sensor data by using the secret cryptographic key.

In some embodiments, at least one data processing circuit component is coupled to a data storage circuit component that includes processing circuit instructions for providing the signature and the first sample of the sensor data to a blockchain system.

In some embodiments, at least one data processing circuit component is coupled to a data storage circuit component that includes processing circuit instructions for collecting a first sample of sensor data from a sensor of the microelectronic device, generating a hash of the first sample of sensor data, and providing the hash and the first sample of the sensor data to an external blockchain system.

In some embodiments, at least one data processing circuit component is coupled to a data storage circuit component that includes processing circuit instructions for accessing a public cryptographic key, collecting a first sample of sensor data from t a sensor of the microelectronic device, encrypting the first sample of sensor data by using the public cryptographic key, and providing the encrypted first sample of the sensor data to a blockchain system.

In some embodiments, at least one data processing circuit component is coupled to a data storage circuit component that includes processing circuit instructions for using the identifying information to generate a secret cryptographic key, collecting a first sample of sensor data from a sensor of the microelectronic device, generating a first data structure that includes the first sample of sensor data, generating a digital signature by signing the first data structure by using the secret cryptographic key, and providing the signature and the first data structure to a blockchain system.

Data Collection Mechanisms and Properties of Hardware Device Embodiments for Capturing Information at the Edge (0200) Direct Coupling Through Integrated Sensors In some embodiments, one or more data collection sensors (e.g., 101 of FIG. 1, 201 of FIG. 2) are integrated into device computation fabric. The sensor or sensors within a device may be of different types, have different function capabilities, data range collection capabilities and operating ranges.

In some embodiments, at least one sensor of a system (e.g. 100 of FIG. 1, 200 of FIG. 2) is included in an integrated circuit semiconductor die that includes at least a portion of the compute fabric (e.g., 102 of FIG. 1, 202 of FIG. 2).

In some embodiments, sensor 101 and a runtime-adaptable compute fabric 102 are included in a same integrated circuit semiconductor die.

In some embodiments, sensors (e.g., 101, 201) include microelectronic circuitry constructed to measure absolute voltages, differential voltages, direct electric current and alternating electric current. In some embodiments, sensors (e.g., 101, 201) include at least one of sensors based on at low-voltage differential signaling (LVDS), and current threshold detectors.

In some embodiments, sensors (e.g., 101, 201) include microelectronic circuitry constructed to measure electromagnetic waves. In some embodiments, the types and spectral bands that the sensors are capable of sensing depend on the semiconductor properties with which said microelectronic circuitry is implemented. In some embodiments, sensors (e.g., 101, 201) include implementations using High-Electron-Mobility Transistors (HEMT) such as those fabricated in Aluminum Gallium Arsenide on Gallium Arsenide for millimeter-wave sensors integrated with processing fabric.

In some embodiments, sensors (e.g., 101, 201) include microelectronic circuitry constructed to measure magnetic waves. In some embodiments, sensing capabilities depend on the semiconductor properties and design specifications with which said microelectronic circuitry is implemented. In some embodiments, sensors (e.g., 101, 201) include implementations using Gallium Arsenide on Gallium Arsenide for micro-Hall Effect sensors integrated with processing fabric.

In some embodiments, sensors (e.g., 101, 201) include microelectronic circuitry constructed to measure temperature. The sensing capabilities depend on the semiconductor properties and design specifications with which said microelectronic circuitry is implemented. In some embodiments, sensors (e.g., 101, 201) include implementations using Gallium Arsenide on Gallium Arsenide for temperature sensors integrated with processing fabric.

In some embodiments, sensors (e.g., 101, 201) include sensors connected to a processing layer through indirect optical coupling through an optical interface layer that is heterogeneously integrated with the processing layer. In some embodiments, sensors (e.g., 101, 201) include implementations using High-Electron-Mobility Transistors—for instance III/V materials such as Indium Gallium Arsenide fabricated photovoltaic based sensors integrated with processing fabric.

(0300) Direct Coupling Through Integrated Interface Medium (Sensors Connected by Direct Coupling to HI Layer Based Interface)

In some embodiments, one or more data collection sensors (e.g., 101 of FIG. 1, 201 of FIG. 2) are fabricated in a separate semiconductor integrated circuit die (e.g., 201) from the one containing the device compute fabric (e.g., 202). In some embodiments, sensors in the die containing the sensor (e.g., 201) are directly coupled to compute fabric in the die containing the device compute fabric (e.g., 202) via an interface medium.

In some embodiments, at least one sensor in the first sensor die 201 and a first runtime-adaptable compute fabric in the die 202 are directly coupled via an interface medium.

In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die. In some embodiments, a sensor or sensors within a sensor die may be of different types, have different function capabilities, data range collection capabilities and operating ranges.

In some embodiments, sensors (e.g., 101, 201) include microelectronic circuitry constructed to measure absolute voltages, differential voltages, direct electric current and alternating electric current. In some embodiments, sensors (e.g., 101, 201) include at least one of sensors based on low-voltage differential signaling (LVDS), and current threshold detectors.

In some embodiments, sensors (e.g., 101, 201) include microelectronic circuitry constructed to measure electromagnetic waves. The types and spectral bands that the sensors are capable of sensing depend on the semiconductor properties with which said microelectronic circuitry is implemented. In some embodiments, sensors (e.g., 101, 201) include implementations using High-Electron-Mobility Transistors (oHEMT) such as those fabricated in Aluminum Gallium Arsenide on Gallium Arsenide for millimeter-wave sensors.

In some embodiments, sensors (e.g., 101, 201) include microelectronic circuitry constructed to measure magnetic waves. The sensing capabilities depend on the semiconductor properties and design specifications with which said microelectronic circuitry is implemented. In some embodiments, sensors (e.g., 101, 201) include implementations using Gallium Arsenide on Gallium Arsenide for micro-Hall Effect sensors.

In some embodiments, sensors (e.g., 101, 201) include microelectronic circuitry constructed to measure temperature. The sensing capabilities depend on the semiconductor properties and design specifications with which said microelectronic circuitry is implemented. In some embodiments, sensors (e.g., 101, 201) include implementations using Gallium Arsenide on Gallium Arsenide for temperature sensors.

In some embodiments, sensors (e.g., 101, 201) include sensors connected to a processing layer through indirect optical coupling through an optical interface layer that is heterogeneously integrated with the processing layer. In some embodiments, sensors (e.g., 101, 201) include implementations using High-Electron-Mobility Transistors—for instance III/V materials such as Indium Gallium Arsenide fabricated photovoltaic based sensors.

(0400) Indirect Coupling Through Integrated Interface Medium (Sensors Connected Through Coupling to HI Layer Based Interface Through One or More Bridge Device)

Figure 3:
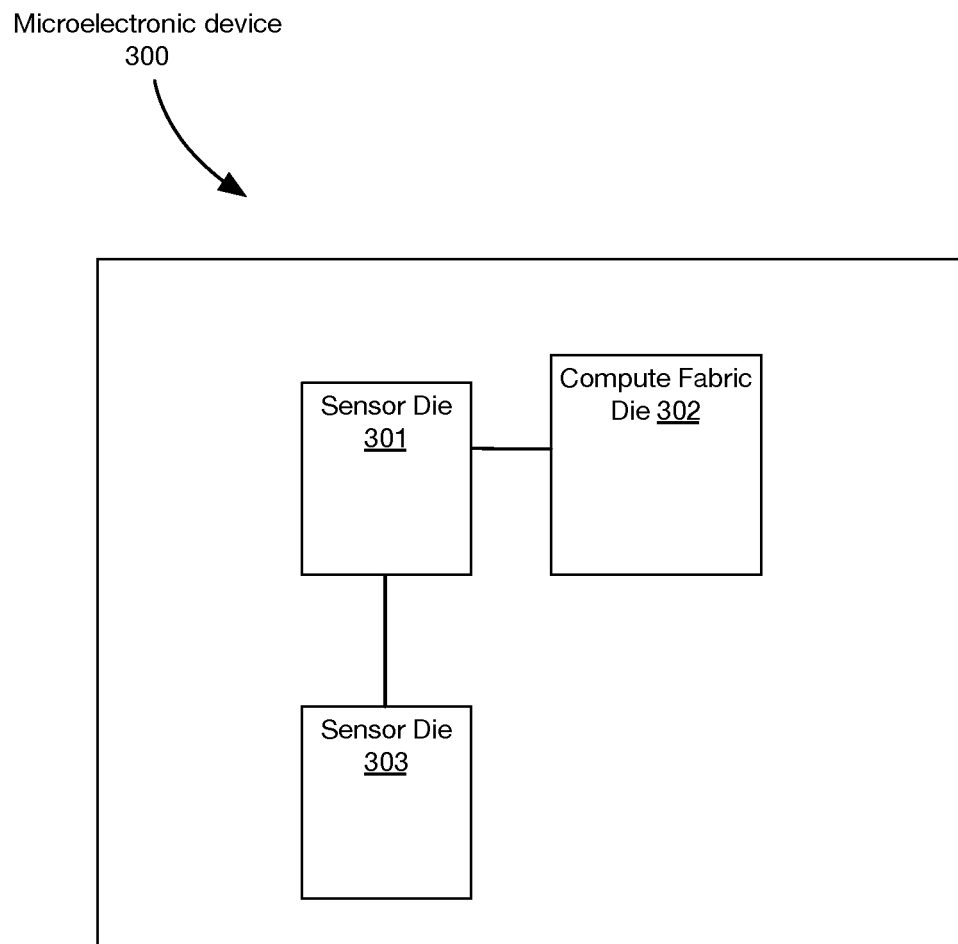
FIG. 3 is a schematic representation of a system, according to embodiments.

FIG. 3 is a schematic representation of a system 300 that is implemented as a microelectronic device that includes at least a first sensor die 301, a first runtime-adaptable compute fabric die 302, and a second sensor die 303. In some embodiments, the first sensor die 301 and the second sensor die are similar to the sensor die 201 of FIG. 2. In some embodiments, the compute fabric die 302 is similar to the compute fabric die 202 of FIG. 2.

In some embodiments, sensors in the die 301 are directly coupled to compute fabric in the die 302 via a first interface medium and sensors in the die 303 are directly coupled to the first sensor die 301 via a second interface medium. In some embodiments, at least one of the first interface medium and the second interface medium is a through-silicon via (TSV) vertical electrical connection. In some embodiments, at least one pair of coupled dies are stacked to form a 3D integrated circuit. In some embodiments, at least one of the first interface medium and the second interface medium involves a stacked 2.5D configuration were adjacent die are interconnected using TSVs and an interposer die is stacked atop the adjacent die.

In some embodiments, the compute fabric in the die 302 is constructed to receive sensor data generated by a sensor in the sensor die 303 via the sensor die 301.

(0500) Indirect Coupling Through Non-Integrated Interface Medium (Sensors Connected to Processing Layer Through a Bridge Device External to Device)

Figure 4:
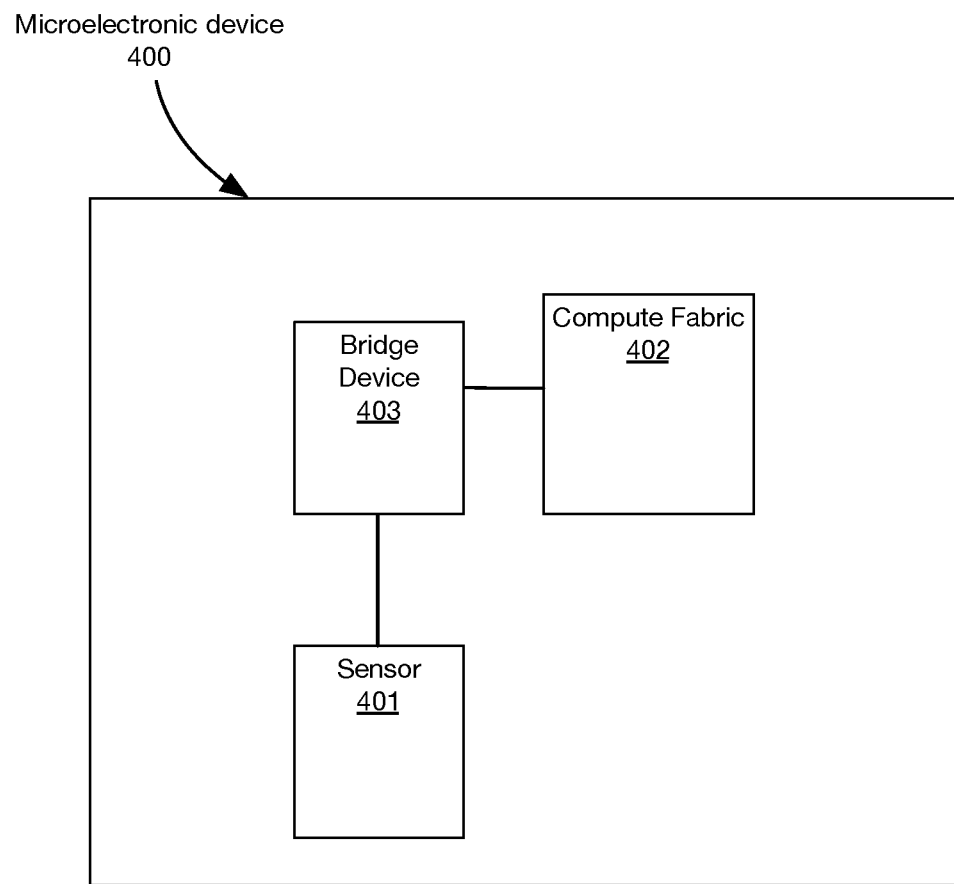
FIG. 4 is a schematic representation of a system, according to embodiments.

FIG. 4 is a schematic representation of a system 400 that is implemented as a microelectronic device that includes at least a first sensor 401, a first runtime-adaptable compute fabric 402, and a first bridge device 403. In some embodiments, the first sensor 401 is similar to the sensor 101 and the compute fabric 402 is similar to the compute fabric 102. In some embodiments, the first sensor 401 is coupled to the first bridge device 403, and the first bridge device 403 is coupled to the first runtime-adaptable compute fabric 402.

In some embodiments, the first runtime-adaptable compute fabric 402 is included in a first compute fabric die.

In some embodiments, the compute fabric die includes the first bridge device 403.

In some embodiments, the first bridge device 403 is included in a second die that is different from the first compute fabric die, and the compute fabric die is coupled to the second die via a first integrated interface medium.

In some embodiments, the first bridge device 403 is included in a second die that is different from the first compute fabric die, and the first sensor 401 is included in a third die that is different from the first compute fabric die and the second die. In some embodiments, the first sensor 401 is coupled to the first bridge device 403 via a first integrated interface medium, as described herein. In some embodiments, the first bridge device 403 is coupled to the compute fabric 402 via a second integrated interface medium, as described herein.

In some embodiments, at least one of the first interface medium and the second interface medium is a through-silicon via (TSV) vertical electrical connection. In some embodiments, at least one pair of coupled dies is stacked to form a 3D integrated circuit. In some embodiments, at least one of the first interface medium and the second interface medium involves a stacked 2.5D configuration were adjacent die are interconnected using TSVs and an interposer die is stacked atop the adjacent die.

In some embodiments, one or more data collection sensors (e.g., 401) are external to the first compute fabric die and connected to the compute fabric die through the first bridge device 403.

(0600) External Direct-Coupled Sensors

In some embodiments, sensor data processed by a first runtime-adaptable compute fabric die (e.g., 202 of FIG. 2) originates from a second runtime-adaptable compute fabric die (e.g., 203 of FIG. 3) coupled to the first runtime-adaptable compute fabric die by direct coupling through an electric interconnect. In some embodiments, sensor data processed by the first runtime-adaptable compute fabric die originates from a third runtime-adaptable compute fabric die coupled to the first runtime-adaptable compute fabric die by indirect coupling via an integrated interface medium, as described herein. In some embodiments, sensor data processed by the first runtime-adaptable compute fabric die originates from a fourth runtime-adaptable compute fabric die coupled to the first runtime-adaptable compute fabric die by indirect coupling via a bridge device, as described herein.

In some embodiments, two runtime-adaptable compute fabrics are included in a same integrated circuit semiconductor die. In some embodiments, the first runtime-adaptable compute fabric and the third runtime-adaptable compute fabric are included in different integrated circuit semiconductor dies, and coupled via an integrated interface medium. In some embodiments, the first runtime-adaptable compute fabric and the fourth runtime-adaptable compute fabric are included in different integrated circuit semiconductor dies, coupled via a bridge device.

In some embodiments, sensor data processed by the first runtime-adaptable compute fabric die originates from a combination of at least a second runtime-adaptable compute fabric die directly coupled to the first runtime-adaptable compute fabric and a third runtime-adaptable compute fabric die indirectly coupled to the first runtime-adaptable compute fabric.

(0700) External Indirect-Coupled Sensors

In some embodiments, sensors included in different external devices are indirectly coupled to the compute fabric device.

Sensor Data Transmitter in Fabric Die

In some embodiments, the sensor 101 and the first runtime-adaptable compute fabric 102 of FIG. 1 are included in an integrated circuit semiconductor die (first die), and the first die also includes at least a first transmitter coupled to the sensor 101. In some embodiments, the transmitter is constructed to transmit sensor data of the sensor 101 to a second sensor that is coupled to a second runtime-adaptable compute fabric. In some embodiments, the second runtime-adaptable compute fabric is included in a second die that is different from the first die. In some embodiments, the first transmitter is a millimeter-wave transmitter. In some embodiments, the first transmitter is a millimeter-wave transmitter that is coupled to the sensor 101, and the sensor 101 is fabricated using HEMT semiconductor materials. In some embodiments, the first transmitter is a millimeter-wave transmitter that is coupled to the second sensor, and the second sensor is fabricated using HEMT semiconductor materials.

Sensor Data Transmitter in Die Separate from Fabric Die

In some embodiments, the first runtime-adaptable compute fabric of the die 202 (of FIG. 2) is coupled to the sensor die 201 (via one of an integrated interface medium and a bridge device as described herein) and the sensor die 201 includes semiconductor materials of a first sensor and at least an integrated first transmitter. In some embodiments, the first transmitter of the die 201 is coupled to the sensor of the die 201. In some embodiments, the first transmitter of the die 201 is constructed to transmit sensor data of the sensor of the die 201 to a second sensor that is coupled to a second runtime-adaptable compute fabric. In some embodiments, the second runtime-adaptable compute fabric is included in a second die that is different from the first die 202. In some embodiments, the first transmitter is a millimeter-wave transmitter. In some embodiments, the first transmitter is a millimeter-wave transmitter that is coupled to the sensor of the die 201, and the sensor of the die 201 is fabricated using HEMT semiconductor materials. In some embodiments, the first transmitter is a millimeter-wave transmitter that is coupled to the second sensor, and the second sensor is fabricated using HEMT semiconductor materials.

In some embodiments, a first runtime-adaptable compute fabric is constructed to process sensor data received from a second runtime-adaptable compute fabric via at least one of a bridge device, an integrated interface medium, and a transmitter, as described herein.

(0800) Mixed Coupled Sensors

In some embodiments, a microelectronic device package includes a plurality of a compute fabric dies, each compute fabric die including at least one compute fabric; wherein at least one compute fabric is coupled to at least one sensor, as described herein; wherein at least a first compute fabric of the microelectronic device package is constructed to receive sensor data via a second compute fabric of the microelectronic device package. In some embodiments, the microelectronic device package includes a plurality of data collection sensors, each sensor being coupled to at least one compute fabric. In some embodiments, the plurality of data collection sensors include at least two sensors that are different in at least one of type, function capabilities, data range collection capabilities and operating ranges. In some embodiments, the plurality of data collection sensors are coupled across one or more devices within the microelectronic device package by any one of the circuit coupling arrangements described herein.

FIG. 7

Figure 7:
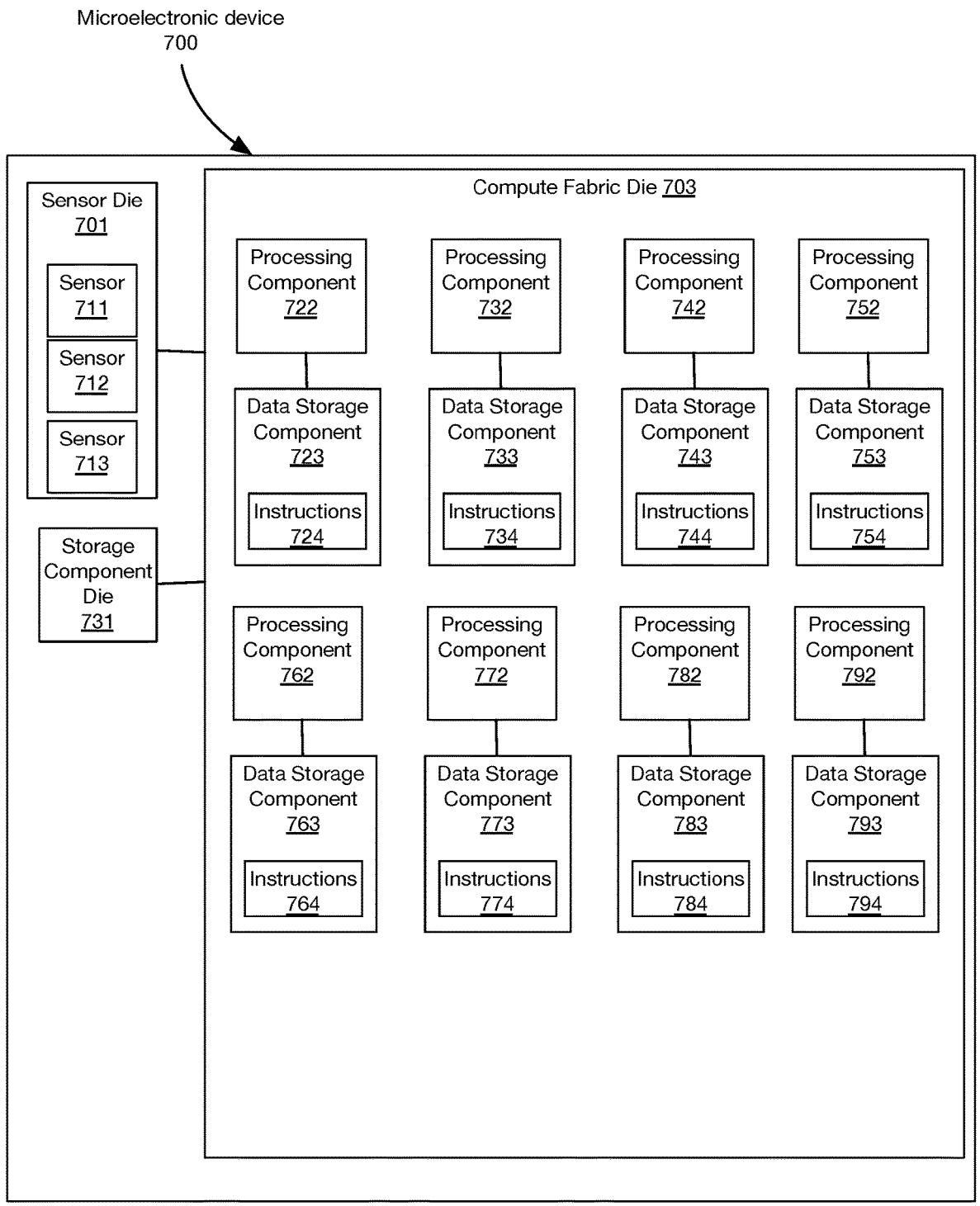
FIGS. 7-14 are schematic representations of systems, according to embodiments.

FIG. 7 is a schematic representation of a system 700, according to some embodiments. In some embodiments, the system 700 includes at least one sensor (e.g., 711, 712, 713) and a runtime-adaptable compute fabric. In some embodiments, the runtime-adaptable compute fabric and the sensor are included in a same microelectronic device.

In some embodiments, the runtime-adaptable compute fabric includes a plurality of compute fabric components, including at least one programmable data processing circuit component (e.g., 722, 732, 742, 752, 762, 772, 782, 792) and at least one data storage circuit component (e.g., 723, 733, 743, 753, 763, 773, 783, 793). In some embodiments, the compute fabric components are arranged on a single compute fabric die (e.g., 703). In some embodiments, the compute fabric components are arranged on a plurality of compute fabric dies. In some embodiments, a programmable data processing circuit component (e.g., 722) is coupled to a corresponding data storage circuit component (e.g., 723), and the data storage circuit component includes instructions (e.g., 724) that are executed by the data processing circuit component (e.g., 722). In some embodiments, a programmable data processing circuit component is re-programmed by updating the instructions (e.g., 724, 734, 744, 754, 764, 774, 784, 794) stored at the corresponding data storage circuit component (e.g., 723, 733, 743, 753, 763, 773, 783, 793).

In some embodiments, system 700 includes a plurality of sensors 711, 712, and 713. In some embodiments, the plurality of sensors and one or more compute fabric components of the runtime-adaptable compute fabric 102 are included in a same microelectronic device package.

In some embodiments, at least one sensor is integrated into the runtime-adaptable compute fabric, wherein the compute fabric includes the one or more compute fabric components.

In some embodiments, at least one sensor is fabricated in a first semiconductor integrated circuit die (e.g., 701), the one or more compute fabric components are fabricated in a second semiconductor integrated circuit die (e.g., 703), and at least one sensor of the first integrated circuit die is directly coupled to at least one compute fabric component of the second semiconductor integrated circuit die via an interface medium.

In some embodiments, at least one sensor is fabricated in a first semiconductor integrated circuit die, the one or more compute fabric components are fabricated in a second semiconductor integrated circuit die, at least one sensor of the first integrated circuit die is directly coupled to at least one compute fabric component of the second semiconductor integrated circuit die via an interface medium, and a sensor external to the microelectronic device is communicatively coupled (or electrically coupled) to a sensor of the first semiconductor integrated circuit die.

In some embodiments, a sensor is communicatively coupled (or electrically coupled) to at least one compute fabric component via a bridge interface medium that is external to the one or more compute fabric component, and the bridge medium is communicatively (or electrically) coupled to the one or more compute fabric component.

In some embodiments, the system 700 is similar to the system 100. In some embodiments, the system 700 is similar to the system 200. In some embodiments, the system 700 is similar to the system 300. In some embodiments, the system 700 is similar to the system 400.

In some embodiments, the instructions 724 include instructions for a dynamic Spline-Laplacian kernel, as described herein.

In some embodiments, the instructions 724 include instructions for generating weighted spatially correlated adjustments for sensor data generated by a sensor of the system 700.

In some embodiments, the instructions 734 include instructions for selecting a first set of unused sensor components (e.g., 712, 713) as intrinsic properties components, and generating and collecting heuristic characterization data from the first set of unused sensor components.

In some embodiments, the instructions 734 include instructions for generating a Physically Unclonable Function (PUF) from the heuristic characterization data.

In some embodiments, the instructions 744 include instructions for generating cryptographic keys by using at least one PUF generated by the second data processing component (e.g., 732). In some embodiments, the instructions 744 include instructions for a fixed codeword length BCH encoder. In some embodiments, the instructions 744 include instructions for a syndrome entropy monitoring routine. In some embodiments, the instructions 744 include instructions for a fuzzy cryptographic extractor.

In some embodiments, the instructions 754 include instructions for performing a hash computation on a first datum of sensor data to generate a hash of the first datum. In some embodiments, the hash computation is a SHA-3 hash computation.

In some embodiments, the instructions 754 include instructions for producing subsequent datums, generating the applicable hashes, and combining the generated hashes into a block, as described herein.

In some embodiments, the instructions 764 include instructions for monitoring the number of blocks generated by the fourth data processing component (e.g., 752), and integrating the blocks into a Merkle Tree when a predetermined number of blocks is generated, as described herein.

In some embodiments, the instructions 764 include instructions for issuing a transaction that adds the root of the generated Merkle Tree to a blockchain of a blockchain system.

In some embodiments, the instructions 774 include instructions for creating a first unique identity attestation for the microelectronic device that generates blocks integrated into the Merkle Tree.

In some embodiments, the instructions 784 include instructions for creating a second unique identity attestation for the microelectronic device that generates blocks integrated into the Merkle Tree.

In some embodiments, the instructions 764 include instructions for publishing the generated Merkle Tree root via transceiver circuitry coupled to an external port of the microelectronic device.

In some embodiments, the instructions 764 include instructions for producing a blockchain receipt.

In some embodiments, the instructions 724 include instructions for encrypting data (e.g., sensor data, data structures, hashes, and the like).

In some embodiments, the instructions 754 include instructions for encrypting data (e.g., sensor data, data structures, hashes, and the like).

In some embodiments, at least one of the instructions 724, 734, 744, 754, 764, 774, 784, 794 include instructions for hashing a public key of a key pair used for encryption.

In some embodiments, at least one of the instructions 724, 734, 744, 754, 764, 774, 784, 794 include instructions for decrypting data (e.g., sensor data, data structures, hashes, and the like).

In some embodiments, the instructions 724, 734, 744, 754, 764, 774, 784, 794 and corresponding processing components 722, 732, 742, 752, 762, 772, 782, 792 of FIG. 7 are distributed across a plurality of compute fabric dies. In some embodiments, each of the processing components 722, 732, 742, 752, 762, 772, 782, 792 of FIG. 7 has a same instruction set and architecture. In some embodiments, each of the processing components 722, 732, 742, 752, 762, 772, 782, 792 can be reprogrammed by updating by reprogramming the corresponding instructions. In this manner, process steps of a method, such as the method described herein with respect to FIG. 6, can be assigned to specific processing components within a microelectronic device, and re-assigned to different processing components during run-time by updating the instructions 724, 734, 744, 754, 764, 774, 784, 794 during run-time.

3. METHODS

FIG. 5

FIG. 5 is a representation of a method 500, according to embodiments.

In some embodiments, the method 500 is performed by the system 100 of FIG. 1. In some embodiments, the method 500 is performed by the system 200 of FIG. 2. In some embodiments, the method 500 is performed by the system 300 of FIG. 3. In some embodiments, the method 500 is performed by the system 400 of FIG. 4. In some embodiments, the method 500 is performed by any one of the systems 700-1400 of FIGS. 7-14, respectively.

In some embodiments, the method 500 is performed by a microelectronic device that includes: a first sensor die (e.g., 201 of FIG. 2) that includes a plurality of sensors including a first sensor (e.g., 211); a plurality of runtime-adaptable compute fabric dies (e.g., 202 of FIG. 2) that each comprise a plurality of programmable data processing circuit components (e.g., 222) and data storage circuit components (e.g., 223), wherein within each compute fabric die (e.g., 202) at least one of the programmable data processing circuit components (e.g., 222) is electrically coupled to at least one of the plurality of data storage circuit components (e.g., 223); and a plurality of storage component dies (e.g., 231), wherein each storage component die (e.g., 231) is electrically coupled to at least one of the plurality of compute fabric dies (e.g., 202), wherein the first sensor die (e.g., 201) and each compute fabric die (e.g., 202) and storage component die (e.g., 231) is an integrated circuit semiconductor die, wherein the plurality of compute fabric dies (e.g., 202) includes at least a first compute fabric die (e.g., 202) and a second compute fabric die (e.g., 203) electrically coupled to the first compute fabric die, wherein at least one of a data processing component (e.g., 222) and a storage component (e.g., 223) of the microelectronic device is electrically coupled to the first sensor (e.g., 211), wherein each compute fabric die (e.g., 202, 203) has a same system architecture, wherein at least one data processing circuit component (e.g., 222) is coupled to a data storage circuit component (e.g., 223) that includes processing circuit instructions (e.g., 224) for selecting at least one of a sensor (e.g., 211), a data storage circuit component (e.g., 223), and a data processing circuit component (e.g., 222) as an intrinsic properties component, and wherein at least one data processing circuit component (e.g., 222, 232, 242, 252) is coupled to a data storage circuit component (e.g., 223, 233, 243, 253) that includes processing circuit instructions (e.g., 224, 234, 244, 254) for generating identifying information by changing biasing and control parameters of the selected intrinsic properties component, and generating the identifying information based on the results of the changing of the biasing and control parameters.

Figure 5A:
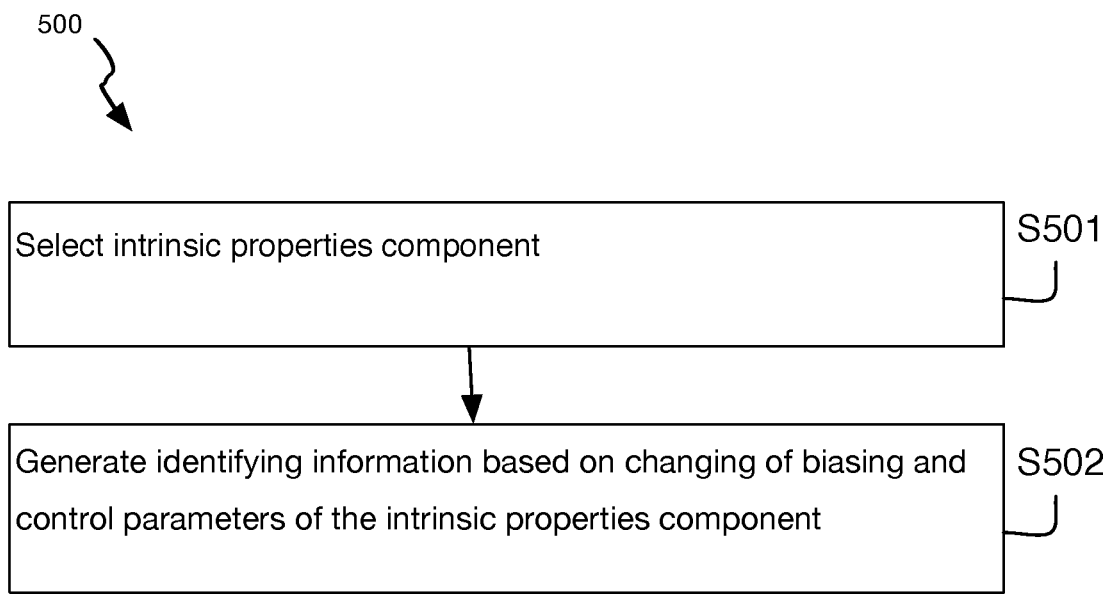
Figure 5B:
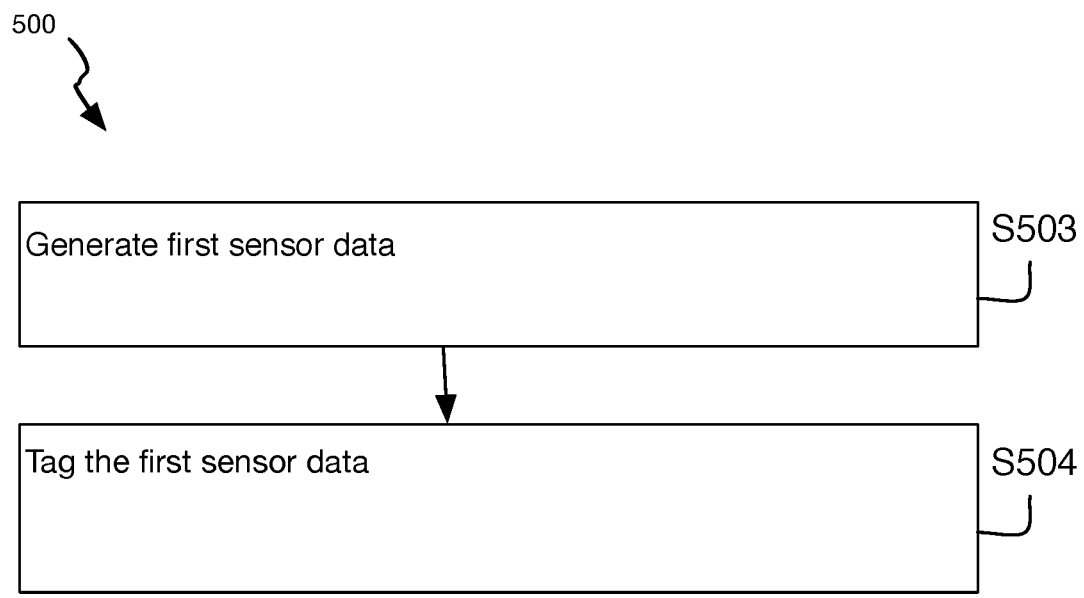
Figure 5C:
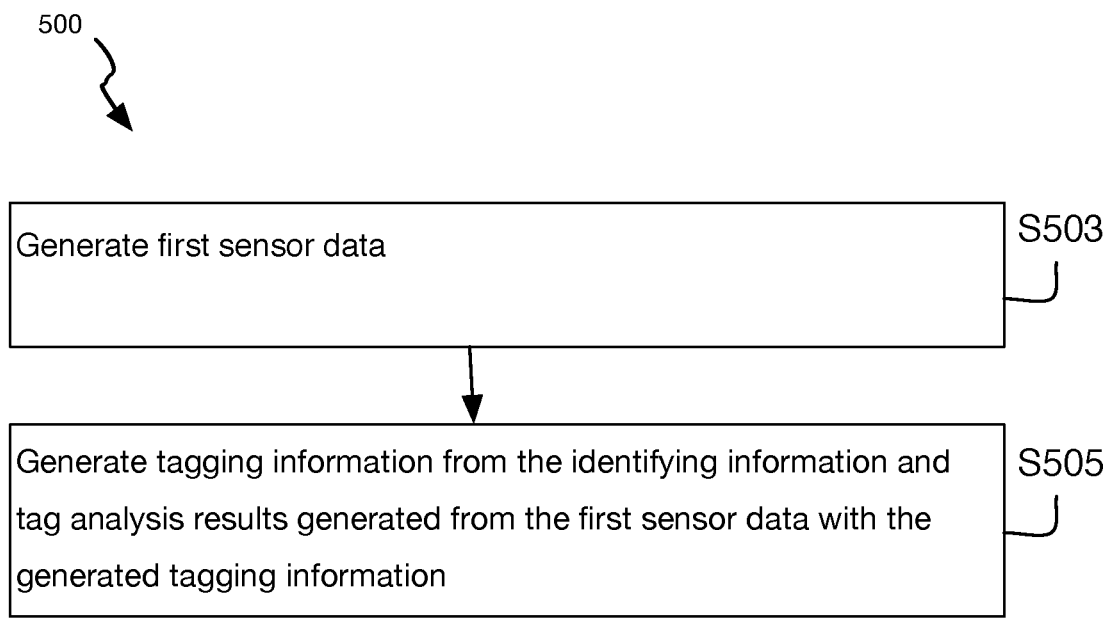
Figure 5D:
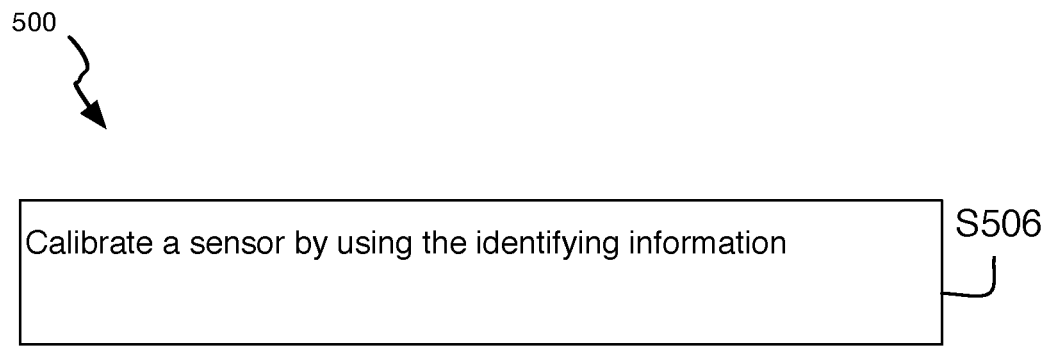
Figure 5E:
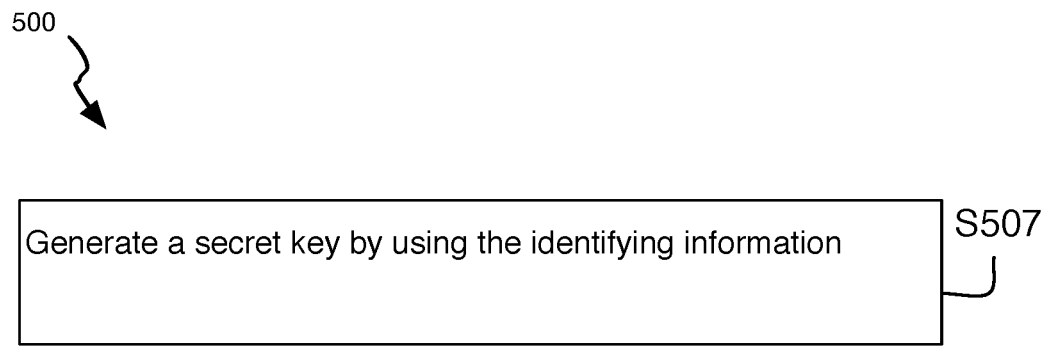
Figure 5F:
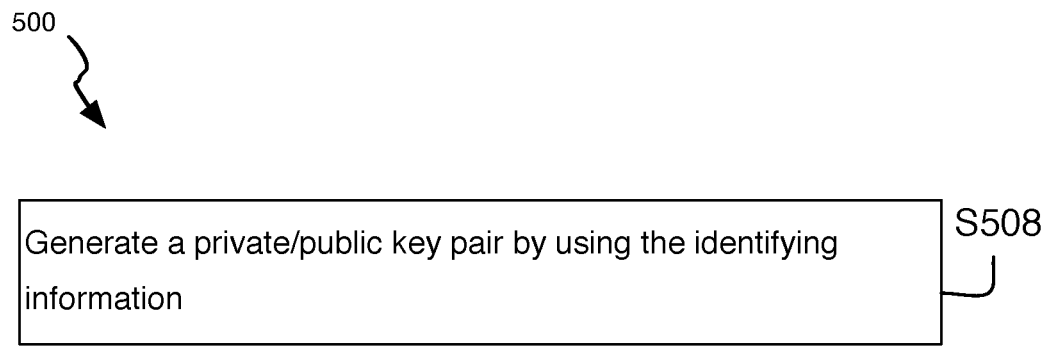
Figure 5G:
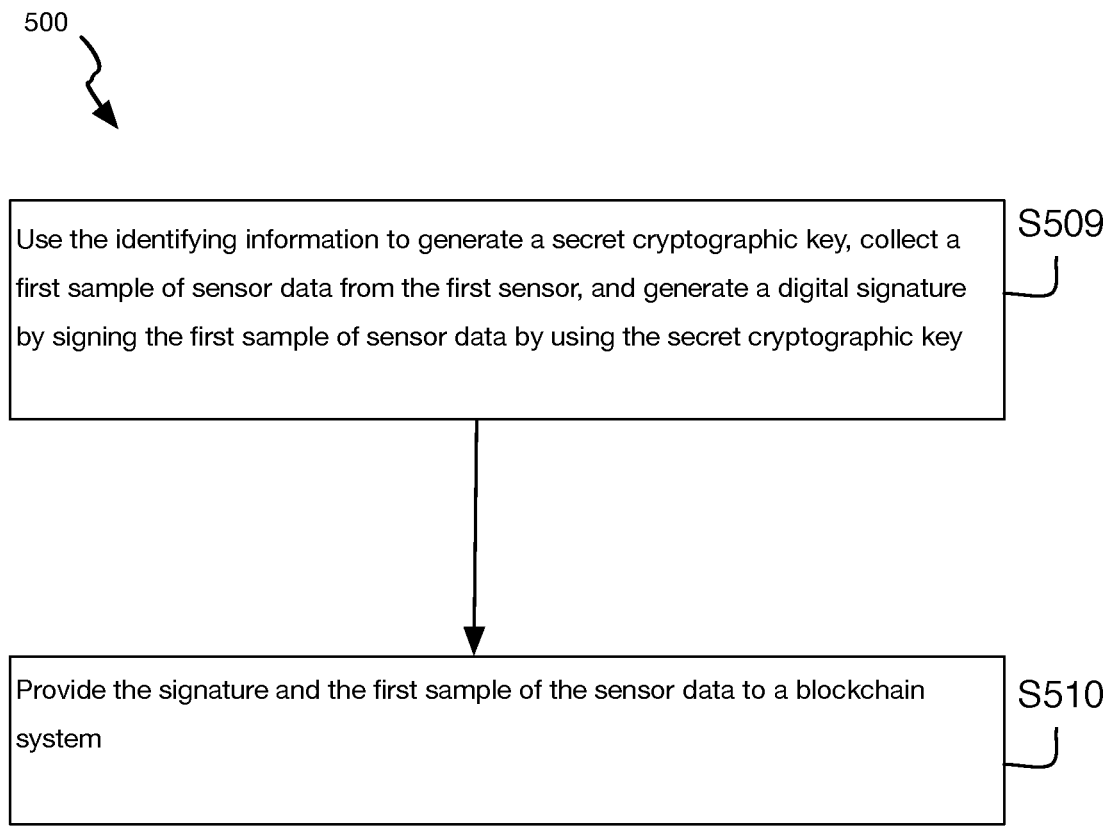
Figure 5H:
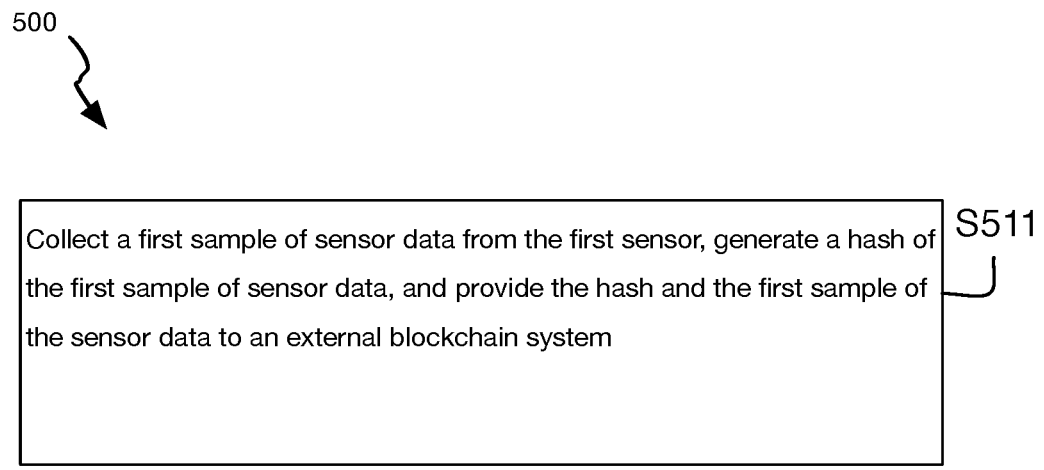
Figure 5I:
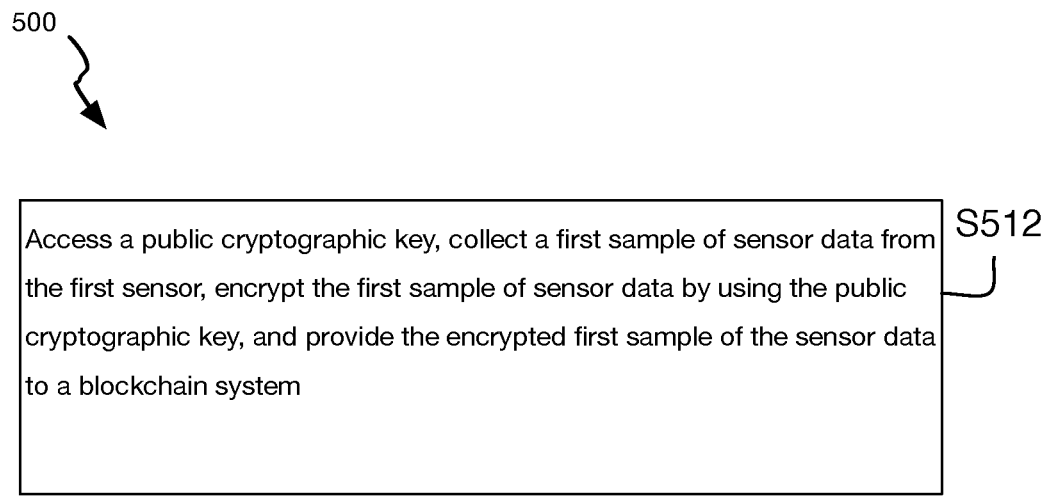

As shown in FIG. 5A, the method 500 includes: a first data processing circuit component (e.g., 222) selecting at least one of a sensor (e.g., 211), a data storage circuit component (e.g., 223), and a data processing circuit component (e.g., 222) of the microelectronic device as an intrinsic properties component (process S501); at least one of the first data processing component (e.g., 222) and a second data processing component (e.g., 232, 242, 252) generating identifying information (process S502). In some embodiments, generating identifying information includes: changing biasing and control parameters of the selected intrinsic properties component, and generating the identifying information based on the results of the changing of the biasing and control parameters.

In some embodiments, the method 500 includes: a first sensor (e.g., 211) of the microelectronic device generating first sensor data (process S503); and at least one data processing circuit component of the microelectronic device tagging the first sensor data with tagging information generated from the identifying information (process S504). In some embodiments, the method 500 includes: at least one data processing circuit component of the microelectronic device generating the tagging information from the identifying information.

In some embodiments, the method 500 includes: at least one data processing circuit component of the microelectronic device generating analysis results for data provided by the first sensor, generating tagging information from the identifying information, and tagging the analysis results (generated for the data provided by the first sensor) with the generated tagging information (process S505).

In some embodiments, the method 500 includes: at least one data processing circuit component of the microelectronic device calibrating at least one of the plurality of sensors by using the identifying information (S506).

In some embodiments, the method 500 includes: at least one data processing circuit component of the microelectronic device generating a secret cryptographic key by using the identifying information (process S507).

In some embodiments, the method 500 includes: at least one data processing circuit component of the microelectronic device generating a cryptographic private/public key pair by using the identifying information (process S508).

In some embodiments, the method 500 includes: at least one data processing circuit component of the microelectronic device using the identifying information to generate a secret cryptographic key, collecting a first sample of sensor data from the first sensor, and generating a digital signature by signing the first sample of sensor data by using the secret cryptographic key (process S509). In some embodiments, the method 500 includes: at least one data processing circuit component of the microelectronic device providing the signature and the first sample of the sensor data to a blockchain system (process S510).

In some embodiments, the method 500 includes: at least one data processing circuit component of the microelectronic device collecting a first sample of sensor data from the first sensor, generating a hash of the first sample of sensor data, and providing the hash and the first sample of the sensor data to an external blockchain system (process 511)

In some embodiments, the method 500 includes: at least one data processing circuit component of the microelectronic device accessing a public cryptographic key, collecting a first sample of sensor data from the first sensor, encrypting the first sample of sensor data by using the public cryptographic key, and providing the encrypted first sample of the sensor data to a blockchain system (process S512).

In some embodiments, the method 500 includes: at least one data processing circuit component of the microelectronic device using the identifying information to generate a secret cryptographic key, collecting a first sample of sensor data from the first sensor, generating a first data structure that includes the first sample of sensor data, generating a digital signature by signing the first data structure by using the secret cryptographic key, and providing the signature and the first data structure to a blockchain system (process S513).

In some embodiments, at least one of the first data processing component and the second data processing component perform the processes S503 to S513. In some embodiments, each of the processes S503 to S513 are performed by different data processing components of the microelectronic device. In some embodiments, instructions for processes S503 to S513 are distributed across processing components of the microelectronic device. In some embodiments, instructions for processes S503 to S513 are distributed across processing components of the microelectronic device, and the distribution of processes across the processing components is updated by the updating program instructions for the processing components stored by respective storage components (e.g., 223).

FIG. 6

Figure 6A:
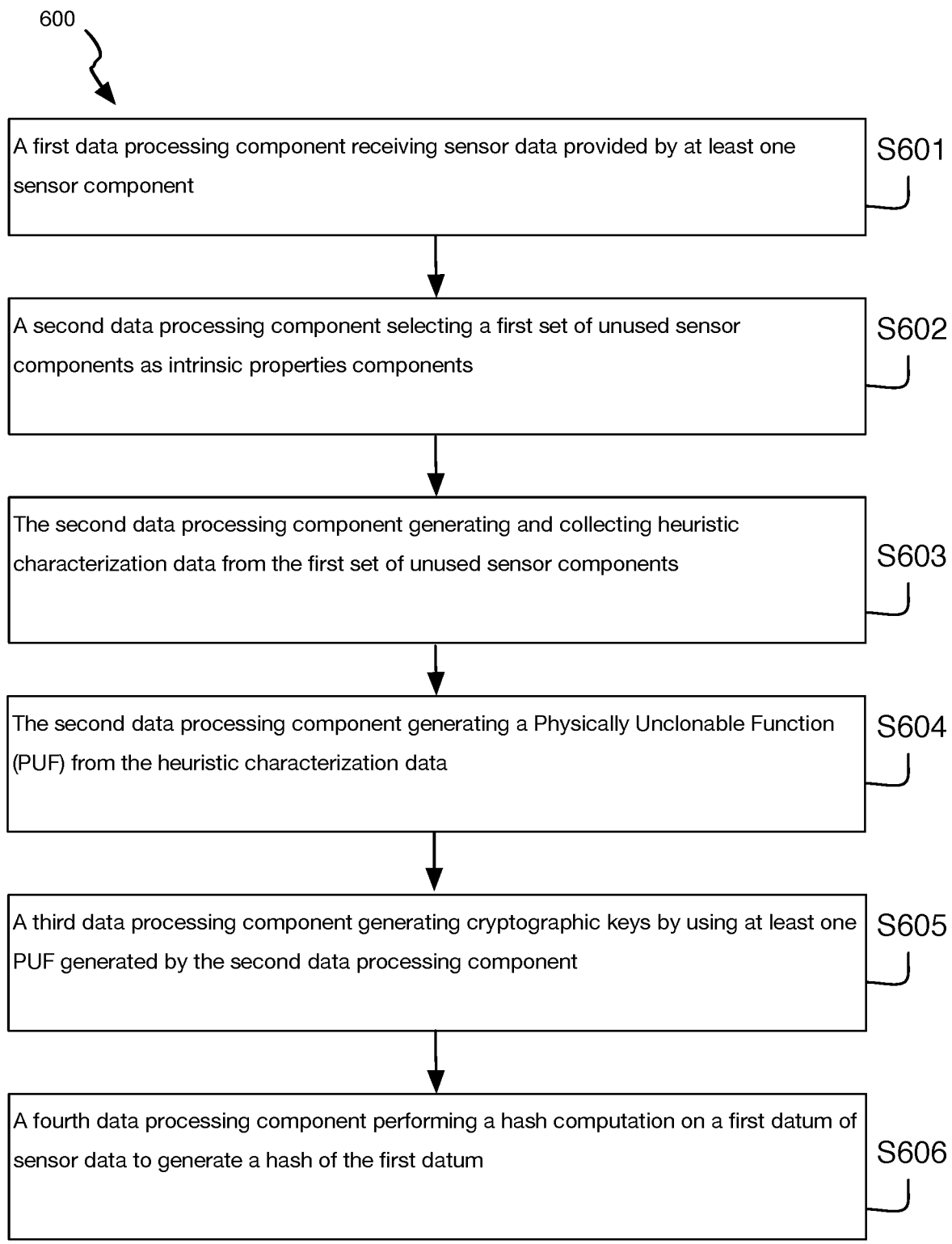
FIGS. 6A-J are representations of methods, according to embodiments.
Figure 6B:
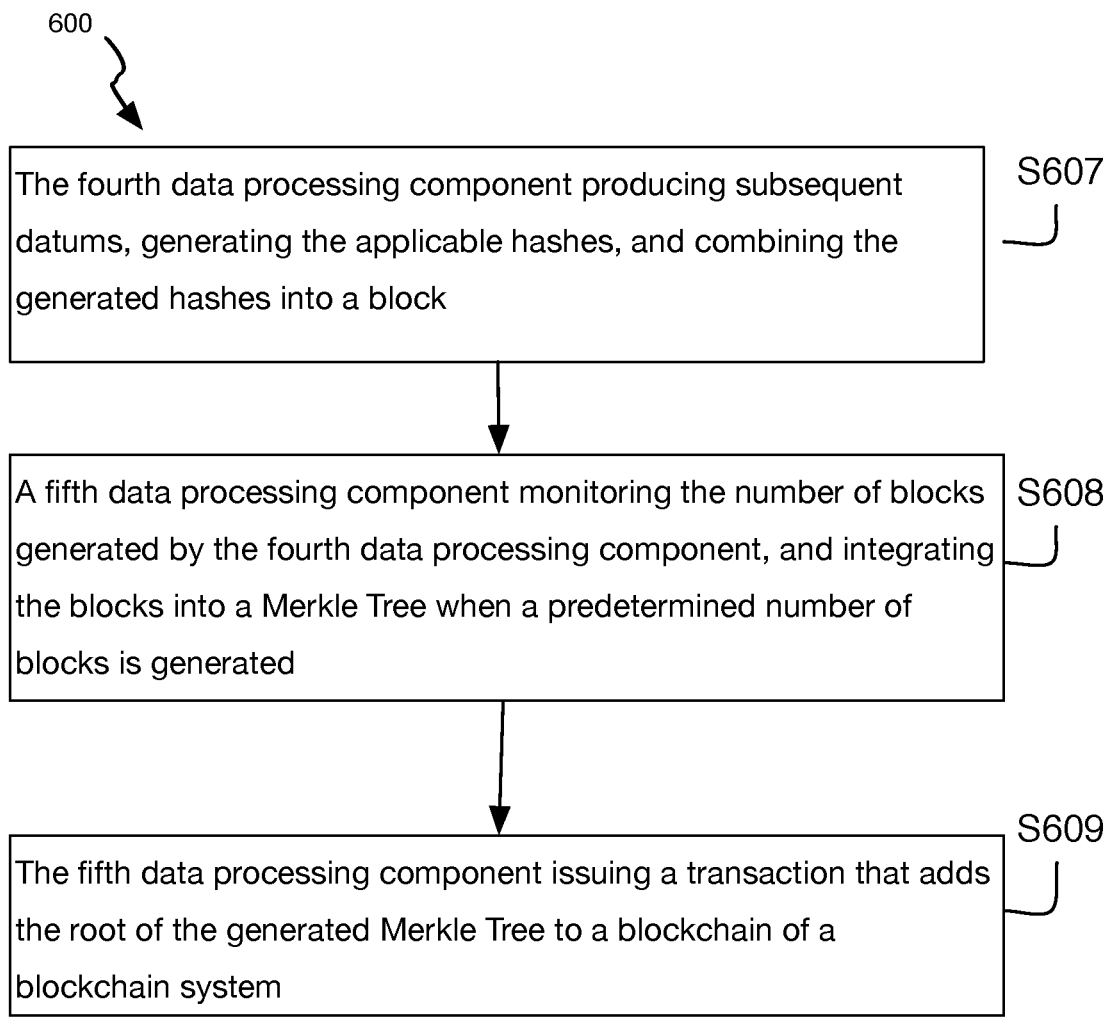
Figure 6C:
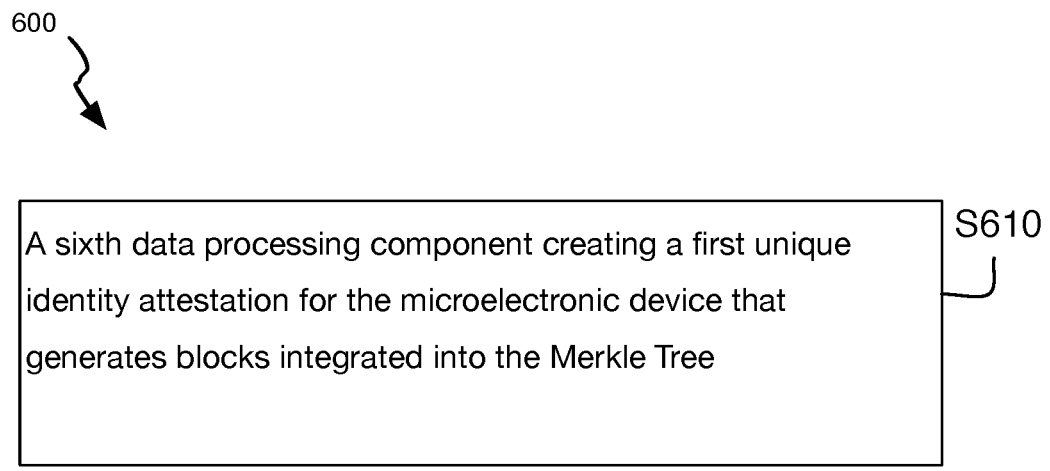
Figure 6D:
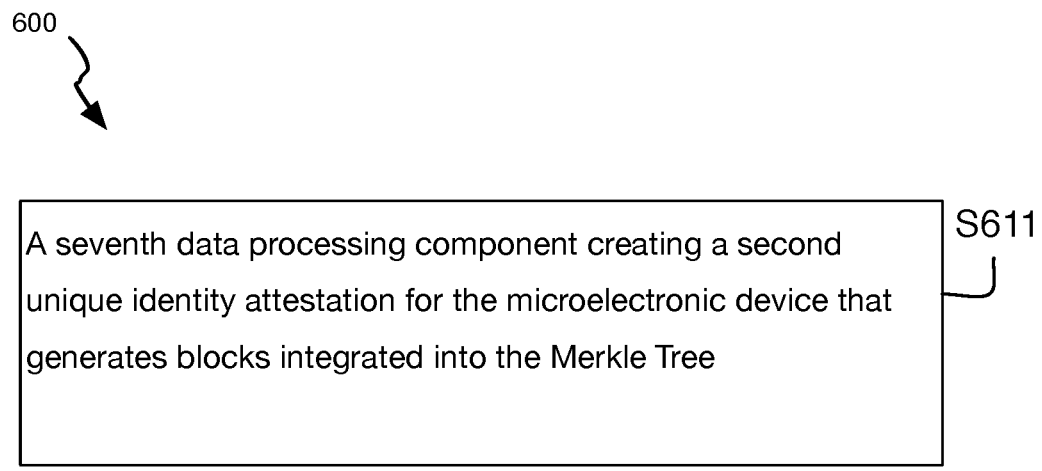
Figure 6E:
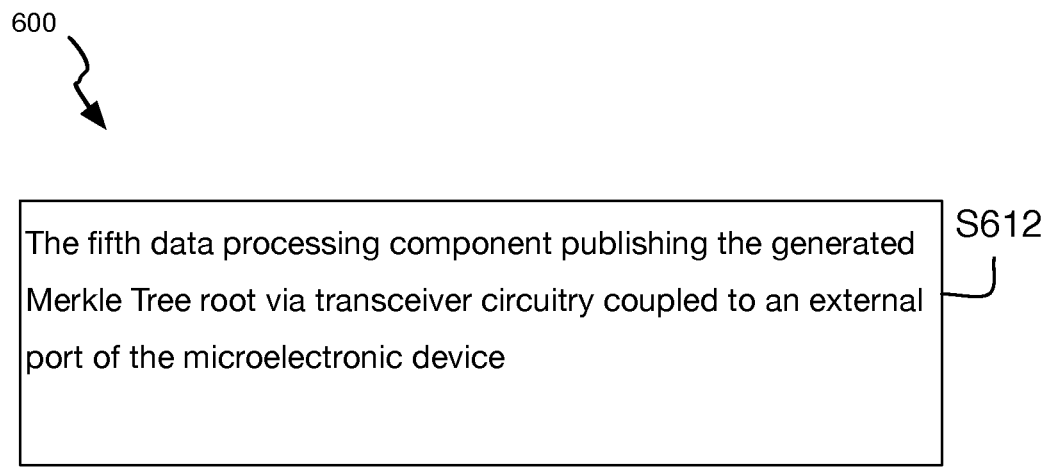
Figure 6F:
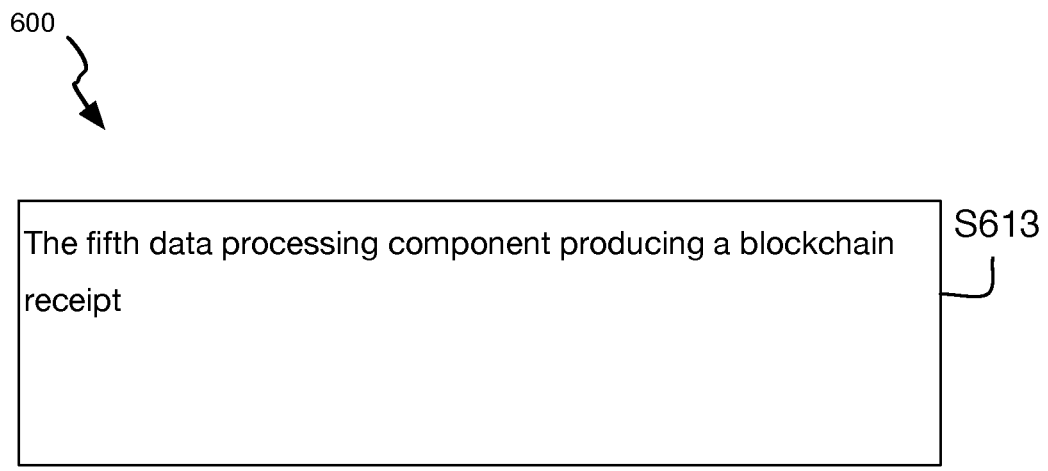
Figure 6G:
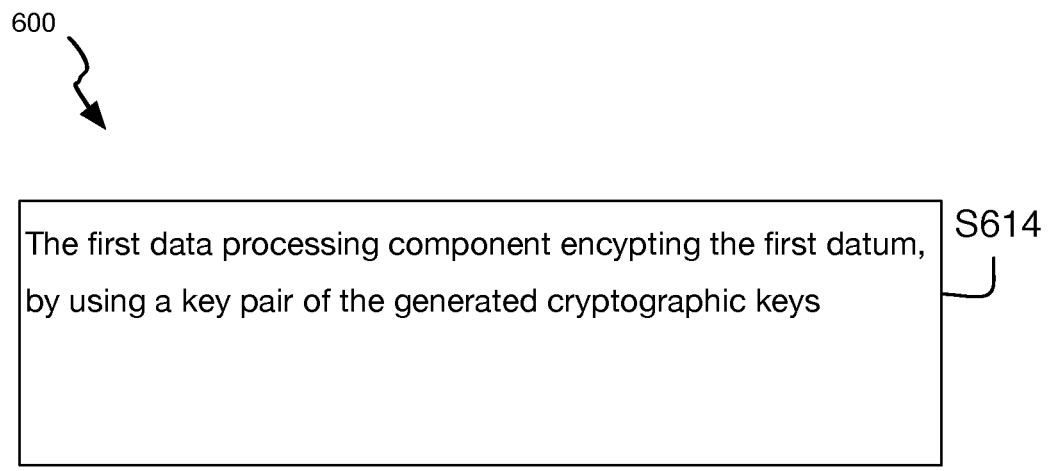
Figure 6H:
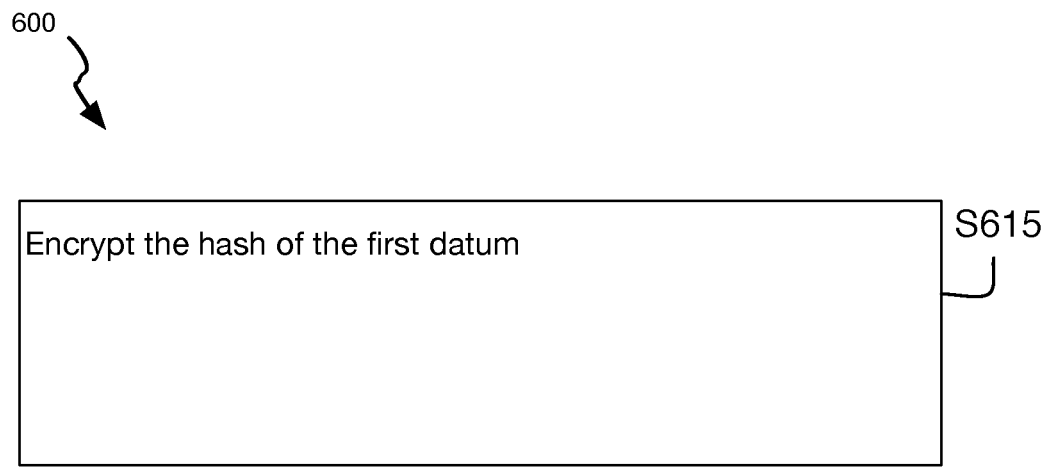
Figure 6I:
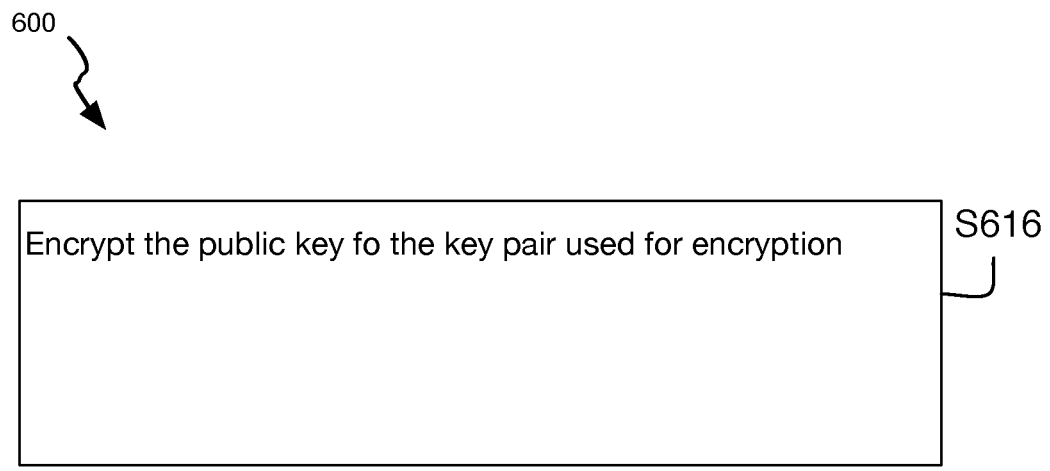
Figure 6J:
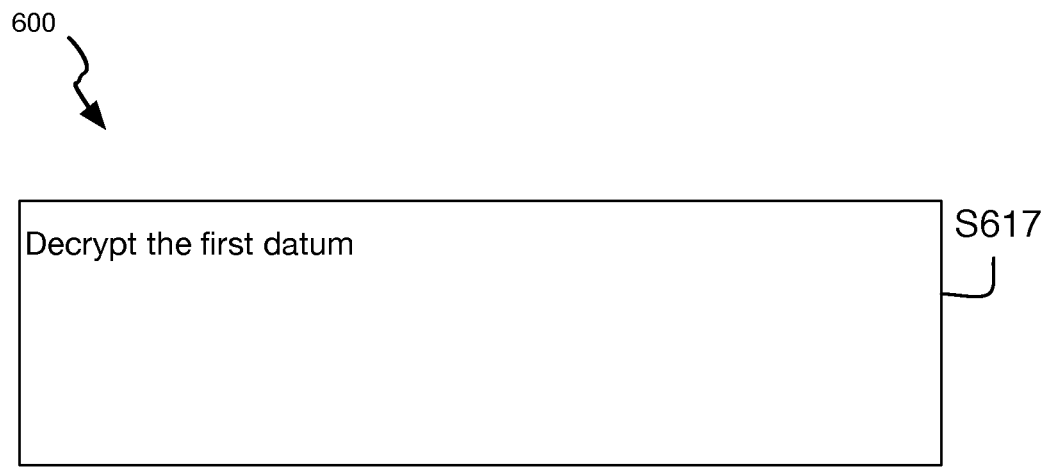

FIG. 6A is a representation of a method 600, according to embodiments.

In some embodiments, the method 600 is performed by the system 100 of FIG. 1. In some embodiments, the method 600 is performed by the system 200 of FIG. 2. In some embodiments, the method 600 is performed by the system 300 of FIG. 3. In some embodiments, the method 600 is performed by the system 400 of FIG. 4. In some embodiments, the method 600 is performed by a microelectronic device similar to the microelectronic device described with respect to the method of FIG. 5.

In some embodiments, the method 600 is performed by any one of the systems 700-1400 of FIGS. 7-14, respectively.

As shown in FIG. 6, the method 600 includes: a first data processing component (e.g., 722 of FIG. 7) of the microelectronic device receiving sensor data provided by at least one sensor component (e.g., 711) of the microelectronic device (process S601). In some embodiments, the sensor data is provided by a first sensor (e.g., 711) of the microelectronic device. In some embodiments, the first sensor is coupled to EEG probes, and the sensor data is measured electrode potential differentials reported by the first sensor. In some embodiments, the first data processing component (e.g., 722) produces weighted spatially correlated adjustments for the received sensor data. In some embodiments, the first data processing component (e.g., 722) uses a dynamic Spline-Laplacian kernel to continuously produce weighted spatially correlated adjustments for the received sensor data.

In some embodiments, the method 600 includes: a second data processing component (e.g., 732) selecting a first set of unused sensor components (e.g., 712, 713) as intrinsic properties components (process S602); the second data processing component (e.g., 732) generating and collecting heuristic characterization data from the first set of unused sensor components (process S603). In some embodiments, the method 600 includes: the second data processing component (e.g., 732) generating a Physically Unclonable Function (PUF) from the heuristic characterization data (process S604).

In some embodiments, the method 600 includes: a third data processing component (e.g., 742) generating cryptographic keys by using at least one PUF generated by the second data processing component (e.g., 732) (process S605). In some embodiments, the third data processing component (e.g., 742) generates the cryptographic keys by using a fixed codeword length BCH encoder. In some embodiments, the third data processing component (e.g., 742) generates the cryptographic keys by using a syndrome entropy monitoring routine to provide an acceptable degree of uniform bit randomness. In some embodiments, the third data processing component (e.g., 742) generates the cryptographic keys by using a fuzzy cryptographic extractor.

In some embodiments, the method 600 includes: a fourth data processing component (e.g., 752) performing a hash computation on a first datum of sensor data to generate a hash of the first datum (process S606). In some embodiments, the first datum includes sensor data adjusted by weighted spatially correlated adjustments generated by the first data processing component (e.g., 722). In some embodiments, the fourth data processing component (e.g., 752) receives the first datum from the first data processing component (e.g., 722). In some embodiments, the hash computation is a SHA-3 hash computation.

In some embodiments, the method 600 includes: the fourth data processing component (e.g., 752) producing subsequent datums, generating the applicable hashes, and combining the generated hashes into a block (process S607). In some embodiments, blocks contain a predetermined number of hashes assigned during the initialization of the first data processing component (e.g., 722). In some embodiments, blocks are organized based on datum properties related to the information source such as by EEG electrode.

In some embodiments, the method 600 includes: a fifth data processing component (e.g., 762) monitoring the number of blocks generated by the fourth data processing component (e.g., 752), and integrating the blocks into a Merkle Tree when a predetermined number of blocks is generated (process S608).

In some embodiments, the method 600 includes: the fifth data processing component (e.g., 762) issuing a transaction that adds the root of the generated Merkle Tree to a blockchain of a blockchain system (process S609). In some embodiments, the blockchain system is a computer system that is constructed to add blocks to a blockchain managed by the blockchain system and provide information stored on the blockchain to external computer systems requesting access to the information stored on the blockchain.

In some embodiments, the method 600 includes: a sixth data processing component (e.g., 772) creating a first unique identity attestation for the microelectronic device that generates blocks integrated into the Merkle Tree (process S610). In some embodiments the sixth data processing component (e.g., 772) communicates with at least one Zero Trust DataStore via transceiver circuitry coupled to an external port of the microelectronic device in order to establish the identity attestation generated by the sixth data processing component (e.g., 772).

In some embodiments, the method 600 includes: a seventh data processing component (e.g., 782) creating a second unique identity attestation for the microelectronic device that generates blocks integrated into the Merkle Tree (process S611). In some embodiments the seventh data processing component (e.g., 782) communicates with at least one Zero Trust DataStore via transceiver circuitry coupled to an external port of the microelectronic device in order to establish the identity attestation generated by the seventh data processing component (e.g., 782).

In some embodiments, the method 600 includes: the fifth data processing component (e.g., 762) publishing the generated Merkle Tree root via transceiver circuitry coupled to an external port of the microelectronic device (process S612). In some embodiments, the method 600 includes: the fifth data processing component (e.g., 762) tagging the published Merkle Tree root with at least one of the first unique identity attestation and the second unique identity attestation.

In some embodiments, the method 600 includes: the fifth data processing component (e.g., 762) producing a blockchain receipt (process S613). In some embodiments, the blockchain receipt is a Merkle proof that is produced by tracing from the Merkle Tree root to a hash of interest.

In some embodiments, the first datum contains personally identifiable information and the first data processing component encrypts the first datum, and the first data processing component (e.g., 722) encrypts the first datum by using a key pair of the generating cryptographic keys (generated in the process S605) (process S614). In some embodiments, the hash of the first datum is encrypted by using the key pair (process S615). In some embodiments, one of the first data processing component (e.g., 722) and the fourth data processing component (e.g., 752) encrypts the hash of the first datum by using the key pair. In some embodiments, a public key of the key pair used for the encryption is hashed (process S616). In some embodiments, one of the first data processing component (e.g., 722) and the fourth data processing component (e.g., 752) generates the hash of the public key. In some embodiments, the first datum is decrypted by using the microelectronic device (process S617). In some embodiments, the encrypted hash of the first datum is decrypted by using the microelectronic device. In some embodiments, the private key needed for decrypting the encrypted first datum is stored at the microelectronic device, and microelectronic device is constructed to prevent access to the private key from devices external to the microelectronic device.

In some embodiments, access to traceable and reliable data from the edge where certain transactions can optionally be encrypted such as described for processes S614 to S617 enables the creation of different blockchain verticals other than the typical patient specific vertical blockchain. Examples include but are not limited to blockchains created using existing blocks from other blockchains for clinical or research data purposes. In these scenarios, marker specific data across several patients is made available but patient personally identifiable information is encrypted. Other scenarios might include the creation of a maintenance blockchain for analyzing the failure rate information of a particular series of probes across multiple units of identical healthcare machinery units or for tracking the biasing conditions for a set of instances of the device described in the embodiments.

4. MACHINES

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

5. CONCLUSION

As a person skilled in the art will recognize from the previous detailed description and from the figures and claims, modifications and changes can be made to the embodiments disclosed herein without departing from the scope defined in the claims.

What is claimed is:

1. A microelectronic device comprising:
   a first sensor die that includes a plurality of sensor circuit components including a first sensor circuit component;
   a plurality of runtime-adaptable compute fabric dies that each comprise a plurality of programmable data processing circuit components and data storage circuit components, wherein within each compute fabric die at least one of the programmable data processing circuit components is electrically coupled to at least one of the plurality of data storage circuit components; and
   a plurality of storage component dies, wherein each storage component die is electrically coupled to at least one of the plurality of compute fabric dies,
   wherein the first sensor die and each compute fabric die and storage component die is an integrated circuit semiconductor die,
   wherein the plurality of compute fabric dies includes at least a first compute fabric die and a second compute fabric die electrically coupled to the first compute fabric die,
   wherein at least one of a data processing component and a storage component of the microelectronic device is electrically coupled to the first sensor circuit component,
   wherein each compute fabric die has a same system architecture,
   wherein at least one data processing circuit component is coupled to a data storage circuit component that includes processing circuit instructions for selecting at least one of a sensor circuit component, a data storage circuit component, and a data processing circuit component of the microelectronic device as an intrinsic properties circuit component, and wherein at least one data processing circuit component is coupled to a data storage circuit component that includes processing circuit instructions for, configuring at least one sensor component operating property that includes at least one of sensor sensitivity, dynamic operating range, and biasing conditions;

generating identifying information by:
changing electrical circuit biasing of the selected intrinsic properties circuit component,
identifying semiconductor manufacturing process variations of the selected intrinsic properties circuit component based on the changing of the electrical circuit biasing, and
generating the identifying information based on the identified semiconductor manufacturing process variations.

2. The microelectronic device of claim 1, wherein at least one data processing circuit component is coupled to a data storage circuit component that includes processing circuit instructions for tagging data provided by the first sensor circuit component with tagging information generated from the identifying information.

3. The microelectronic device of claim 1, wherein at least one data processing circuit component is coupled to a data storage circuit component that includes processing circuit instructions for tagging analysis results generated for data provided by the first sensor circuit component with tagging information generated from the identifying information.

4. The microelectronic device of claim 1, wherein at least one data processing circuit component is coupled to a data storage circuit component that includes processing circuit instructions for calibrating at least one of the plurality of sensor circuit components by using the identifying information.

5. The microelectronic device of claim 1, wherein at least one data processing circuit component is coupled to a data storage circuit component that includes processing circuit instructions for generating a secret cryptographic key by using the identifying information.

6. The microelectronic device of claim 1, wherein at least one data processing circuit component is coupled to a data storage circuit component that includes processing circuit instructions for generating a cryptographic private/public key pair by using the identifying information.

7. The microelectronic device of claim 1, wherein at least one data processing circuit component is coupled to a data storage circuit component that includes processing circuit instructions for using the identifying information to generate a secret cryptographic key, collecting a first sample of sensor data from the first sensor circuit component, and generating a digital signature by signing the first sample of sensor data by using the secret cryptographic key.

8. The microelectronic device of claim 7, wherein at least one data processing circuit component is coupled to a data storage circuit component that includes processing circuit instructions for providing the signature and the first sample of the sensor data to a blockchain system.

9. The microelectronic device of claim 1, wherein at least one data processing circuit component is coupled to a data storage circuit component that includes processing circuit instructions for collecting a first sample of sensor data from the first sensor circuit component, generating a hash of the first sample of sensor data, and providing the hash and the first sample of the sensor data to an external blockchain system.

10. The microelectronic device of claim 1, wherein at least one data processing circuit component is coupled to a data storage circuit component that includes processing circuit instructions for accessing a public cryptographic key, collecting a first sample of sensor data from the first sensor circuit component, encrypting the first sample of sensor data by using the public cryptographic key, and providing the encrypted first sample of the sensor data to a blockchain system.

11. The microelectronic device of claim 1, wherein at least one data processing circuit component is coupled to a data storage circuit component that includes processing circuit instructions for using the identifying information to generate a secret cryptographic key, collecting a first sample of sensor data from the first sensor circuit component, generating a first data structure that includes the first sample of sensor data, generating a digital signature by signing the first data structure by using the secret cryptographic key, and providing the signature and the first data structure to a blockchain system.

12. A microelectronic device comprising:
a first sensor die that includes a first plurality of sensor circuit components including a first sensor circuit component;
a plurality of runtime-adaptable compute fabric dies that each comprise a plurality of programmable data processing circuit components, data storage circuit components, and at least a second sensor circuit component, wherein within each compute fabric die at least one of the programmable data processing circuit components is electrically coupled to at least one of the plurality of data storage circuit components, and wherein within each compute fabric die at least one of the programmable data processing circuit components is electrically coupled to at least one of the second sensor circuit component and a sensor circuit component of the first plurality of sensor circuit components; and
a plurality of storage component dies, wherein each storage component die is electrically coupled to at least one of the plurality of compute fabric dies,
wherein the first sensor die and each compute fabric die and storage component die is an integrated circuit semiconductor die,
wherein the plurality of compute fabric dies includes at least a first compute fabric die and a second compute fabric die electrically coupled to the first compute fabric die,
wherein at least one of a data processing component and a storage component of the microelectronic device is electrically coupled to the first sensor circuit component,
wherein each compute fabric die has a same system architecture,
wherein at least one data processing circuit component is coupled to a data storage circuit component that includes processing circuit instructions for selecting at least one of a sensor circuit component, a data storage circuit component, and a data processing circuit component of the microelectronic device as an intrinsic properties circuit component, and
wherein at least one data processing circuit component is coupled to a data storage circuit component that includes processing circuit instructions for:
configuring at least one sensor component operating property that includes at least one of sensor sensitivity, dynamic operating range, and biasing conditions;

generating identifying information by:
changing electrical circuit biasing of the selected intrinsic properties circuit component,
identifying semiconductor manufacturing process variations of the selected intrinsic properties circuit component based on the changing of the electrical circuit biasing, and
generating the identifying information based on the identified semiconductor manufacturing process variations.

13. The microelectronic device of claim 1,
wherein at least one data processing circuit component is coupled to a data storage circuit component that includes processing circuit instructions for selecting at least one data storage circuit component of the microelectronic device, and
wherein at least one data processing circuit component is coupled to a data storage circuit component that includes processing circuit instructions for generating identifying information by:
changing electrical circuit biasing of the selected at least one data storage circuit component to collect information pertinent to the unique intrinsic physical specificities of the selected at least one data storage circuit component, and
generating the identifying information based the collected information.

14. The microelectronic device of claim 1,
wherein at least one data processing circuit component is coupled to a data storage circuit component that includes processing circuit instructions for selecting at least one data processing circuit component of the microelectronic device, and
wherein at least one data processing circuit component is coupled to a data storage circuit component that includes processing circuit instructions for generating identifying information by:
changing electrical circuit biasing of the selected at least one data processing circuit component to collect information pertinent to the unique intrinsic physical specificities of the selected at least one data processing circuit component, and
generating the identifying information based the collected information.

15. The microelectronic device of claim 1, wherein changing the electrical circuit biasing comprises: changing a bias voltage of the selected intrinsic properties circuit component.

16. The microelectronic device of claim 15, wherein the bias voltage is a DC voltage.

17. The microelectronic device of claim 1, wherein changing the electrical circuit biasing comprises: changing a bias current of the selected intrinsic properties circuit component.

18. The microelectronic device of claim 1, wherein the selected intrinsic properties circuit component is a data processing circuit component of the microelectronic device, and wherein changing the electrical circuit biasing comprises: changing a bias current and a bias voltage applied to a terminal of the selected data processing circuit component.

19. The microelectronic device of claim 18, wherein the bias voltage applied to the terminal of the selected data processing circuit component is a DC voltage.

20. A microelectronic device comprising:
a first sensor die that includes a plurality of sensor circuit components including a first sensor circuit component;
a plurality of runtime-adaptable compute fabric dies that each comprise a plurality of programmable data processing circuit components and data storage circuit components, wherein within each compute fabric die at least one of the programmable data processing circuit components is electrically coupled to at least one of the plurality of data storage circuit components; and
a plurality of storage component dies, wherein each storage component die is electrically coupled to at least one of the plurality of compute fabric dies,
wherein the first sensor die and each compute fabric die and storage component die is an integrated circuit semiconductor die,
wherein the plurality of compute fabric dies includes at least a first compute fabric die and a second compute fabric die electrically coupled to the first compute fabric die,
wherein at least one of a data processing component and a storage component of the microelectronic device is electrically coupled to the first sensor circuit component,
wherein each compute fabric die has a same system architecture,
wherein at least one data processing circuit component is coupled to a data storage circuit component that includes processing circuit instructions for selecting at least one of a sensor circuit component, a data storage circuit component, and a data processing circuit component of the microelectronic device as an intrinsic properties circuit component, and
wherein at least one data processing circuit component is coupled to a data storage circuit component that includes processing circuit instructions for:
configuring at least one sensor component operating property that includes at least one of sensor sensitivity, dynamic operating range, and biasing conditions;
generating identifying information by:
changing electrical circuit biasing of the selected intrinsic properties circuit component wherein the electrical circuit biasing comprises one or more selected from the set of: a bias current, a bias voltage, a DC voltage,
identifying semiconductor manufacturing process variations of the selected intrinsic properties circuit component based on the changing of the electrical circuit biasing, and
generating the identifying information based on the identified semiconductor manufacturing process variations.

* * * * *